United States Patent
Kobayashi

(10) Patent No.: US 10,353,646 B2
(45) Date of Patent: Jul. 16, 2019

(54) INFORMATION PROCESSING APPARATUS, INFORMATION PROCESSING SYSTEM, AND INFORMATION PROCESSING METHOD

(71) Applicant: Hiroto Kobayashi, Saitama (JP)

(72) Inventor: Hiroto Kobayashi, Saitama (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/815,853

(22) Filed: Nov. 17, 2017

(65) Prior Publication Data

US 2018/0143793 A1    May 24, 2018

(30) Foreign Application Priority Data

Nov. 24, 2016  (JP) .................................. 2016-228015

(51) Int. Cl.
 *G06F 3/12*   (2006.01)
 *G06F 9/44*   (2018.01)
 *H04N 1/32*   (2006.01)
 *G06K 15/02*  (2006.01)
 *G06F 9/4401* (2018.01)

(52) U.S. Cl.
 CPC .......... *G06F 3/1206* (2013.01); *G06F 3/1205* (2013.01); *G06F 3/1208* (2013.01); *G06F 3/1225* (2013.01); *G06F 3/1247* (2013.01); *G06F 3/1285* (2013.01); *G06F 9/4411* (2013.01); *G06F 3/1211* (2013.01); *H04N 1/32529* (2013.01)

(58) Field of Classification Search
 None
 See application file for complete search history.

(56) References Cited

U.S. PATENT DOCUMENTS

| 8,730,490 B2 * | 5/2014 | Miyabe ............... G06F 9/44526 358/1.13 |
| 8,848,217 B2 | 9/2014 | Kobayashi |
| 8,867,077 B2 | 10/2014 | Kobayashi |

(Continued)

FOREIGN PATENT DOCUMENTS

| JP | 2010-218309 | 9/2010 |
| JP | 2012-226582 | 11/2012 |

*Primary Examiner* — Beniyam Menberu
(74) *Attorney, Agent, or Firm* — IPUSA, PLLC

(57) ABSTRACT

An information processing apparatus executes a printer driver that requests an image processing apparatus to perform image processing on data. The information processing apparatus includes a processor, in communication with a memory, executing a process including executing, by a plurality of process executors, predetermined processes corresponding to extended functions added to the printer driver, according to a request from the printer driver; storing process information relating to the predetermined processes that are respectively executed by the plurality of process executors; determining an execution order of the predetermined processes that are respectively executed by the plurality of process executors in the printer driver, based on the stored process information; and requesting the plurality of process executors to execute, on the data, the predetermined processes in the determined execution order, according to an instruction from the printer driver.

16 Claims, 21 Drawing Sheets

(56) References Cited

U.S. PATENT DOCUMENTS

| | | | |
|---|---|---|---|
| 8,887,163 B2 * | 11/2014 | Rastogi | G06F 9/4881 |
| | | | 718/102 |
| 8,953,214 B2 | 2/2015 | Kobayashi | |
| 9,052,850 B2 | 6/2015 | Araki | |
| 9,274,736 B2 | 3/2016 | Kobayashi | |
| 9,298,411 B2 | 3/2016 | Kobayashi | |
| 9,442,678 B2 | 9/2016 | Kobayashi et al. | |
| 9,547,461 B2 | 1/2017 | Kobayashi et al. | |
| 2005/0149950 A1 * | 7/2005 | Shikata | G06F 3/1204 |
| | | | 719/321 |
| 2006/0044610 A1 * | 3/2006 | Miyata | G06F 21/608 |
| | | | 358/1.15 |
| 2006/0050955 A1 * | 3/2006 | Yamazaki | H04N 1/46 |
| | | | 382/162 |
| 2009/0051954 A1 * | 2/2009 | Miyata | G06F 3/1205 |
| | | | 358/1.13 |
| 2010/0123726 A1 * | 5/2010 | Ito | G06T 11/60 |
| | | | 345/501 |
| 2010/0186020 A1 * | 7/2010 | Maddhirala | G06F 9/5038 |
| | | | 718/105 |
| 2011/0058199 A1 | 3/2011 | Kobayashi | |
| 2011/0058205 A1 * | 3/2011 | Araki | G06F 3/1203 |
| | | | 358/1.13 |
| 2011/0128564 A1 * | 6/2011 | Kayama | H04N 1/00204 |
| | | | 358/1.13 |
| 2011/0286036 A1 | 11/2011 | Kobayashi | |
| 2012/0140269 A1 | 6/2012 | Kobayashi | |
| 2012/0307275 A1 * | 12/2012 | Tamashima | G06F 3/1205 |
| | | | 358/1.13 |
| 2013/0047162 A1 * | 2/2013 | Stefanov | G06F 9/5033 |
| | | | 718/102 |
| 2013/0169987 A1 * | 7/2013 | Akiyama | G06F 9/44505 |
| | | | 358/1.13 |
| 2014/0195585 A1 * | 7/2014 | Mihara | H04L 67/10 |
| | | | 709/201 |
| 2015/0170010 A1 * | 6/2015 | Koziarz | G06K 15/1855 |
| | | | 358/1.18 |
| 2015/0237231 A1 * | 8/2015 | Hirose | H04N 1/21 |
| | | | 358/1.15 |
| 2016/0124693 A1 * | 5/2016 | Okuma | G06F 3/1275 |
| | | | 358/1.15 |
| 2017/0078520 A1 | 3/2017 | Kobayashi | |

* cited by examiner

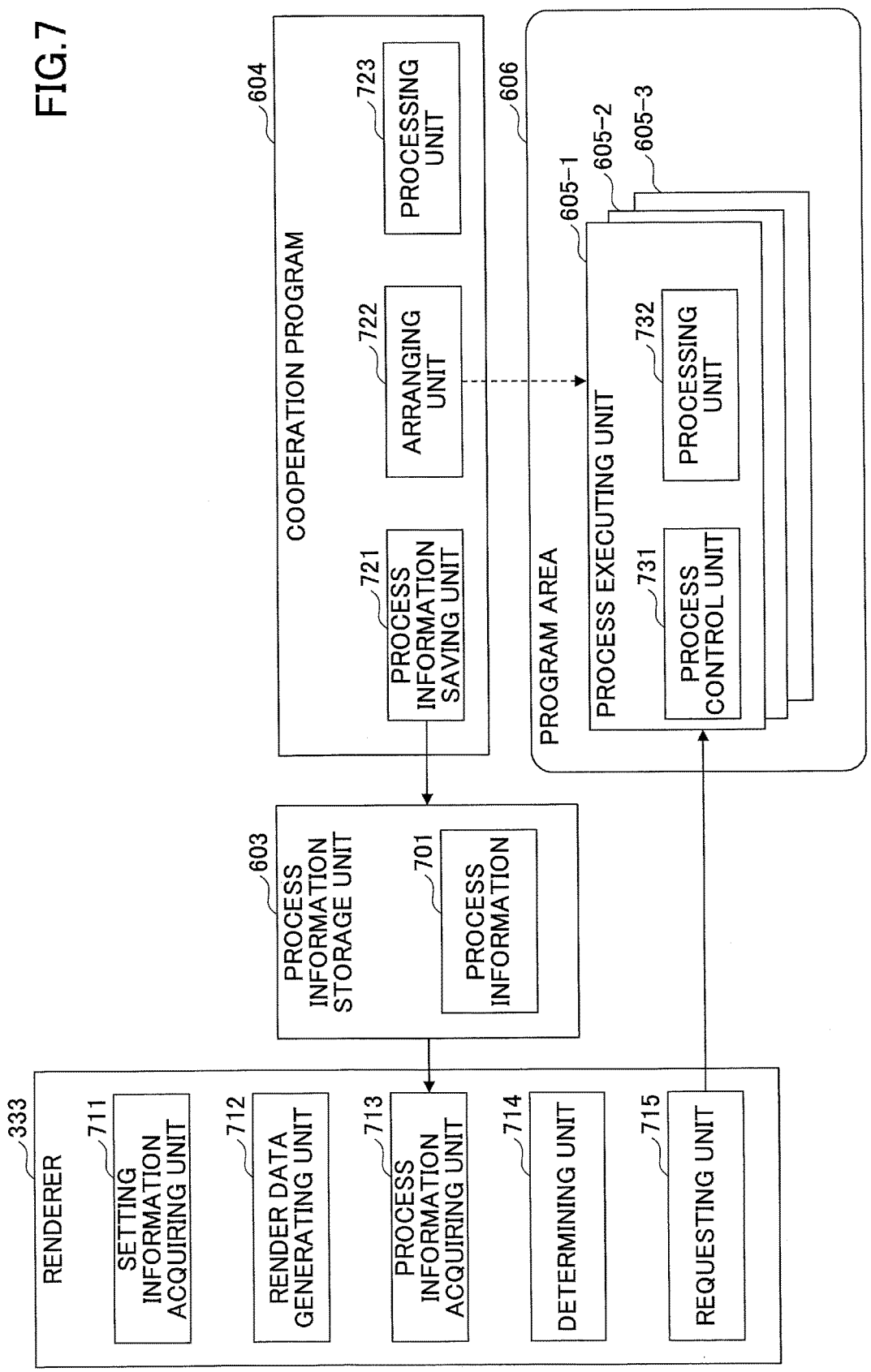

FIG.8A

```
[
  "name": "programA",
  "path": "C:\programA\Aplugin.dll",
  "action": "modify"
]
```
811 — "name": "programA",
812 — "path": "C:\programA\Aplugin.dll",
813 — "action": "modify"

```
[
  "name": "program1",
  "path": "C:\ProgramFiles\program1\bin\1program.dll",
  "action": "read"
]
```

```
[
  "name": "programZ",
  "path": "C:\programZ\Zplugin.dll",
  "action": "transfer"
]
```

```
{
  [
    {
      "name":"programA",
      "path":"C:¥programA¥Aplugin.dll",
      "action":"modify"
    },
    {
      "name":"programB",
      "path":"C:¥ProgramFiles¥ProgramB¥bin¥Bplugin.dll",
      "action":"modify"
    }
  ]
}
```

```
[
  {
    "name" : "program1",
    "path" : "C:\program1\1plugin.dll",
    "action" : "read"
  },
  {
    "name" : "programB",
    "path" : "C:\ProgramFiles\ProgramB\bin\Bplugin.dll",
    "action" : "read"
  }
]
```

SELECT COOPERATION SOLUTION — 1420

PLEASE SELECT

| NAME | DESCRIPTION | TO COOPERATE |
|---|---|---|
| MONITOR DATA | RECORD JOB LOG | ☑ |
| TRANSFER TO CLOUD | TRANSFER TO DEVICE OTHER THAN PRINTER | ☑ |
| INDIVIDUAL AUTHENTICATION | ADD AUTHENTICATION FUNCTION | ☐ |

1421

1422

[ OK ]   [ CANCEL ]

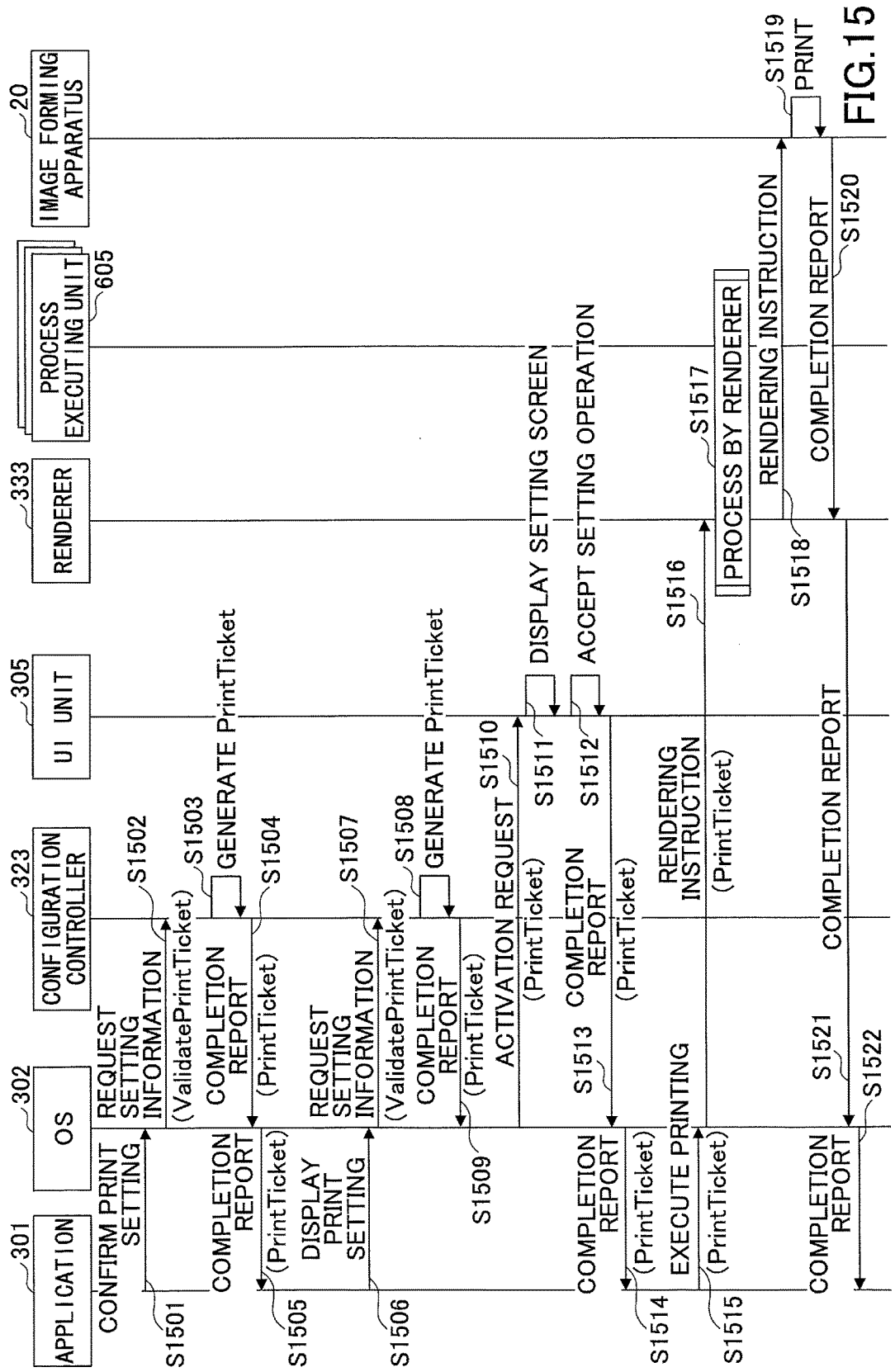

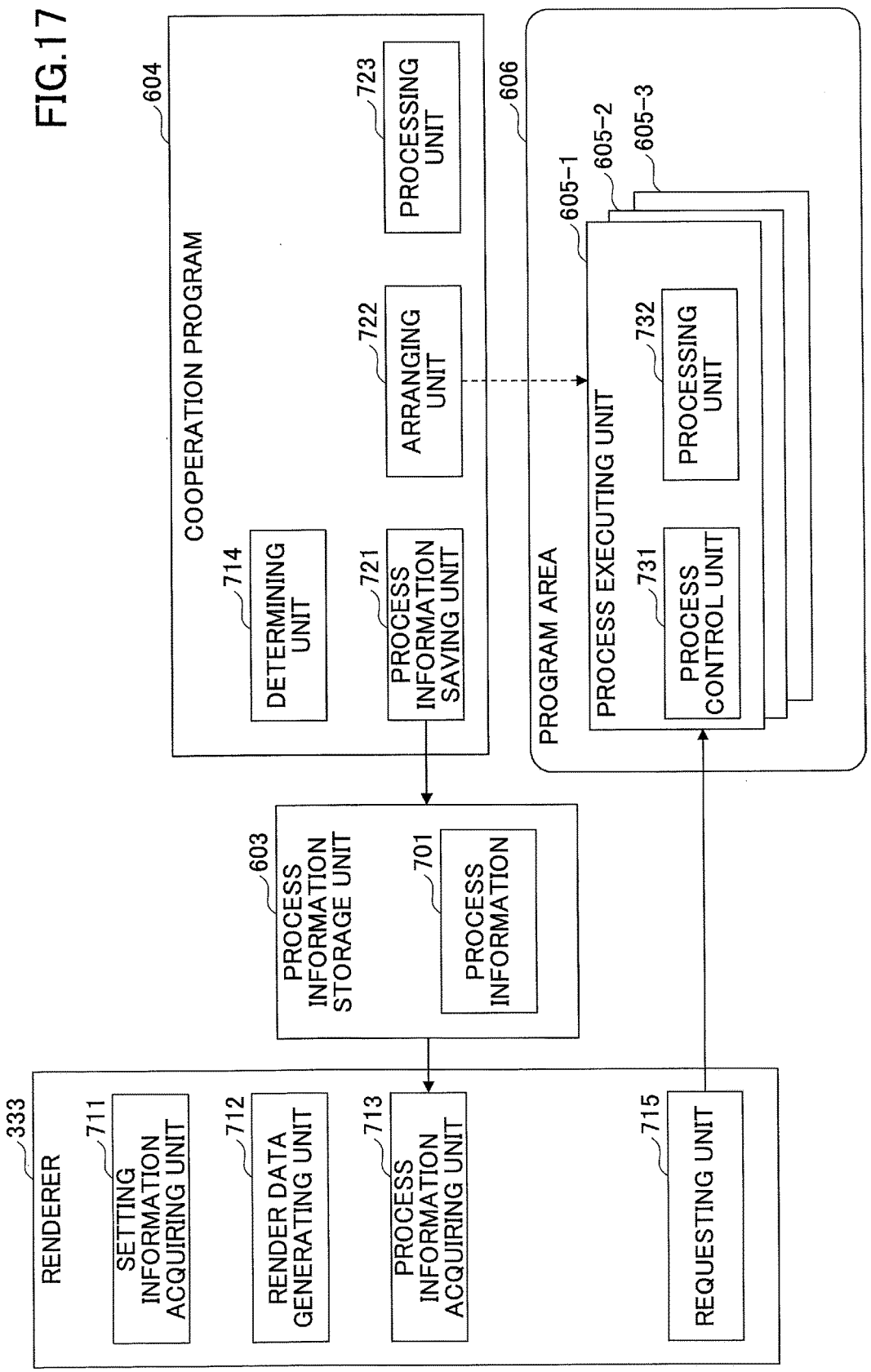

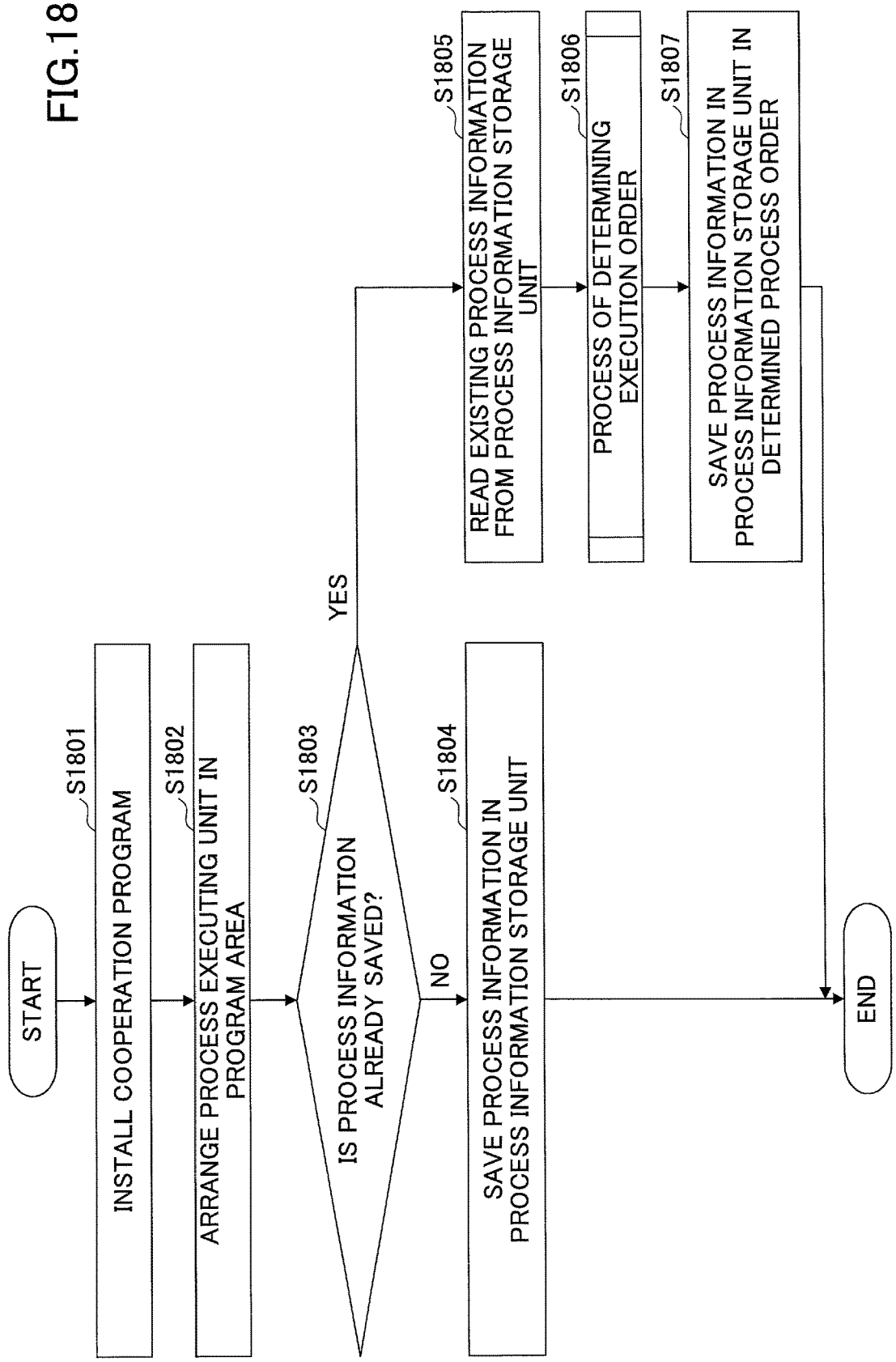

FIG.19

```
[
  {
    "name":"program1",
    "path":"C:¥ProgramFiles¥program1¥bin¥1program.dll",
    "action":"modify",
    "settings":"color==color"
  },
  {
    "name":"programZ",
    "path":"C:¥programZ¥Zplugin.dll",
    "action":"read",
    "settings":"color==color"
  },
  {
    "name":"softwareC",
    "path":"C:¥softwareC¥Cplugin.dll",
    "action":"transfer"
  }
]
```

1901 — first block
1904 — settings line in first block
1902 — second block
1903 — third block
701 — window

INFORMATION PROCESSING APPARATUS, INFORMATION PROCESSING SYSTEM, AND INFORMATION PROCESSING METHOD

CROSS-REFERENCE TO RELATED APPLICATION

The present application claims priority under 35 U.S.C. § 119 to Japanese Patent Application No. 2016-228015, filed on Nov. 24, 2016, the contents of which are incorporated herein by reference in their entirety.

BACKGROUND OF THE INVENTION

1. Field of the Invention

The present invention relates to an information processing apparatus, an information processing system, and an information processing method.

2. Description of the Related Art

In the Operating System (OS) on Windows from Windows (registered trademark) 2000 to Windows 7 of the related art, an architecture referred to as a Version 3 (hereinafter referred to as "V3") printer driver is adopted as the architecture of the printer driver. Furthermore, in the Windows OS on and subsequent to Windows 8, in addition to Version 3, an architecture of a new printer driver referred to as a Version 4 (hereinafter referred to as "V4") printer driver has been adopted.

Furthermore, there is known a technique of later adding an extended function, as a plug-in, to the printer driver (see, for example, Patent Document 1).

Patent Document 1: Japanese Unexamined Patent Application Publication No. 2010-218309

SUMMARY OF THE INVENTION

An aspect of the present invention provides an information processing apparatus, an information processing system, and an information processing method, in which one or more of the disadvantages of the related art are reduced.

According to one aspect of the present invention, there is provided an information processing apparatus for executing a printer driver that requests an image processing apparatus to perform image processing on data, the information processing apparatus including a processor, in communication with a memory, executing a process including executing, by a plurality of process executors, predetermined processes corresponding to extended functions added to the printer driver, according to a request from the printer driver; storing, in a storage, process information relating to the predetermined processes that are respectively executed by the plurality of process executors; determining an execution order of the predetermined processes that are respectively executed by the plurality of process executors in the printer driver, based on the stored process information; and requesting the plurality of process executors to execute, on the data, the predetermined processes in the determined execution order, according to an instruction from the printer driver.

BRIEF DESCRIPTION OF THE DRAWINGS

FIG. 7 is a functional block diagram of a renderer and a cooperation program according to a first embodiment of the present invention;

FIGS. 8A through 8C illustrate examples of process information according to the first embodiment of the present invention;

FIGS. 11A and 11B are diagrams illustrating examples of the execution order of processes according to the first embodiment of the present invention;

FIGS. 14A and 14B are diagrams illustrating examples of a setting screen according to the second embodiment of the present invention;

FIG. 15 is a sequence diagram of an example of a printing process according to the second embodiment of the present invention;

FIG. 17 is a functional block diagram of the renderer and the cooperation program according to a third embodiment of the present invention;

FIG. 18 is a flowchart of an example of an installing process of a cooperation program according to the third embodiment of the present invention; and FIG. 19 is a diagram illustrating an example of process information according to the third embodiment of the present invention.

DETAILED DESCRIPTION OF THE PREFERRED EMBODIMENTS

In the related art, when a plurality of extended functions (plug-ins and extension programs, etc.) are added later to the printer driver and used, unless the order of executing the extended functions is taken into consideration, it may not be possible to perform the desired processes (the processes intended to be performed by adding the extended functions) on the print data.

For example, it is assumed that there is an extended function A for editing print data, and an extended function B for previewing the print data. In this case, if the extended function A is executed after executing the extended function B, in the preview of the extended function B, the image of the print data before being edited by the extended function A, will be displayed. Therefore, the content of the actual printed matter will differ from the preview image.

A problem to be solved by an embodiment of the present invention is to enable processes to be performed in the desired order, by the extended functions that have been added to a printer driver, in the printer driver to which a plurality of extended functions can be added.

In the following, embodiments of the present disclosure are described in detail by referring to the accompanying drawings.

<System Configuration>

Figure 1:
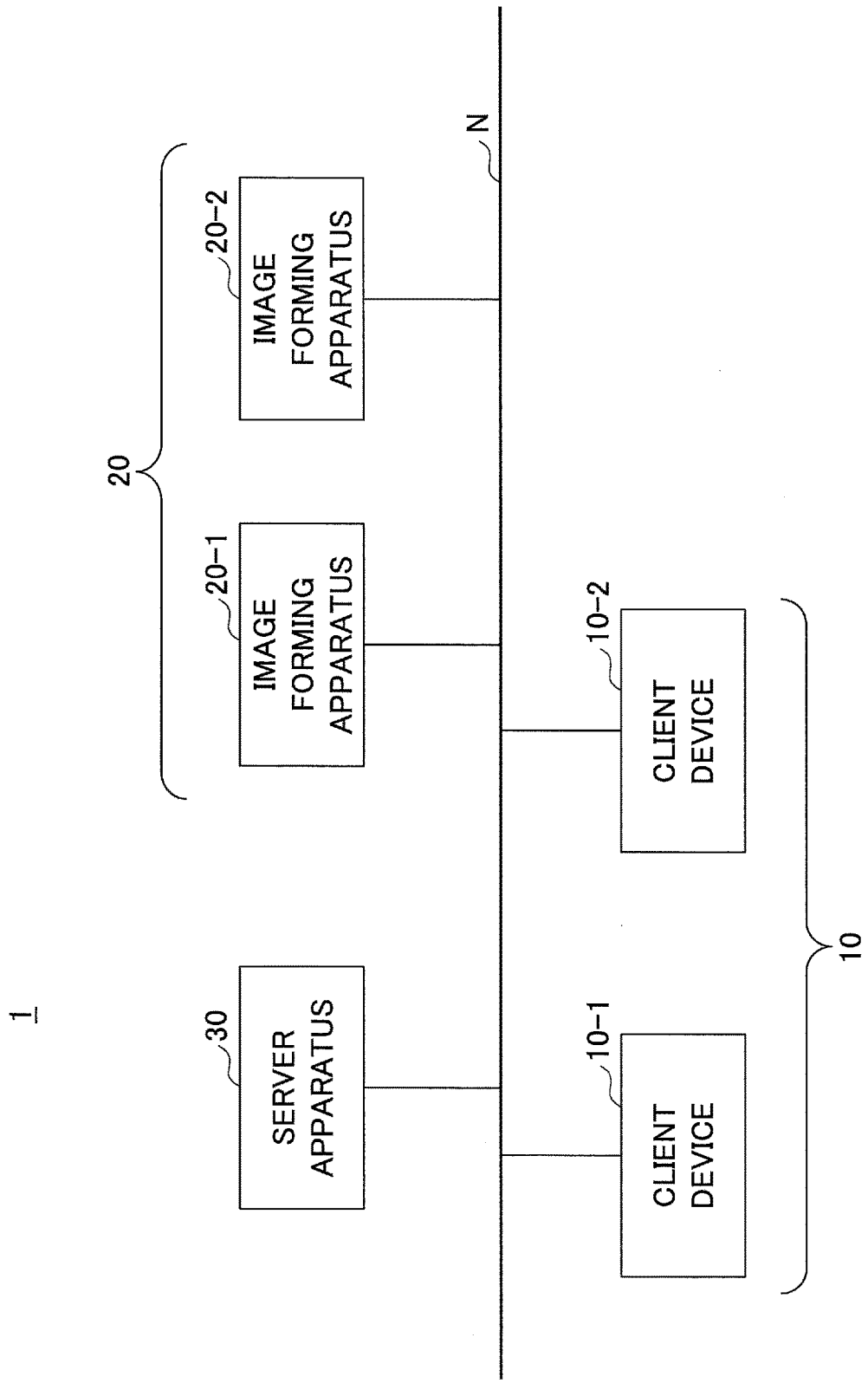
FIG. 1 is a diagram illustrating a system configuration of an example of an information processing system according to an embodiment of the present invention.

First, a system configuration of an information processing system 1 according to an embodiment is described by referring to FIG. 1. FIG. 1 is a diagram illustrating a system configuration of an example of the information processing system 1 according to the embodiment.

As illustrated in FIG. 1, the information processing system 1 according to the embodiment includes one or more client devices 10; one or more image forming apparatuses 20; and a server apparatus 30. These devices are coupled to each other through a network N, such as a local area network (Local Area Network), so that these devices can communicate each other.

The client device 10 may be, for example, a personal computer (PC), a smartphone, or a tablet terminal. Upon receiving, for example, a print instruction from a user, the client device 10 creates print data from data to be printed (print target data), and the client device 10 transmits the print data to the image forming apparatus 20. Alternatively, upon receiving, for example, a print instruction from a user, the client device 10 transmits print target data to the server apparatus 30.

Note that the print target data is, for example, printable electronic data, such as image data and document data. Furthermore, the print data is, for example, electronic data obtained by converting the print target data into data in a Page Description Language (PDL) format that can be printed by the image forming apparatus 20.

The image forming apparatus 20 is, for example, a printer or a Multifunction Peripheral (MFP) with a printing function. The image forming apparatus 20 prints the print data received from the client device 10 or the server apparatus 30.

The server apparatus 30 is, for example, a personal computer (PC). For example, the server apparatus 30 creates print data from print target data received from the client device 10, and the server apparatus 30 transmits the created print data to the image forming apparatus 20.

The server apparatus 30 may also function as a file server. Namely, the server apparatus 30 may store, for example, print data received from the client device 10, and, upon receiving a request from the image forming apparatus 20, the server apparatus 30 may transmit the stored print data to the requesting image forming apparatus 20.

Note that, in the following descriptions, when the one or more client devices 10 are to be distinguished from each other, the one or more client devices 10 may be denoted as "client device 10-1" and "client device 10-2", for example. Similarly, when the one or more image forming apparatuses 20 are to be distinguished from each other, the one or more image forming apparatuses 20 may be denoted as "image forming apparatus 20-1" and "image forming apparatus 20-2", for example.

<Hardware Configuration>

Figure 2:
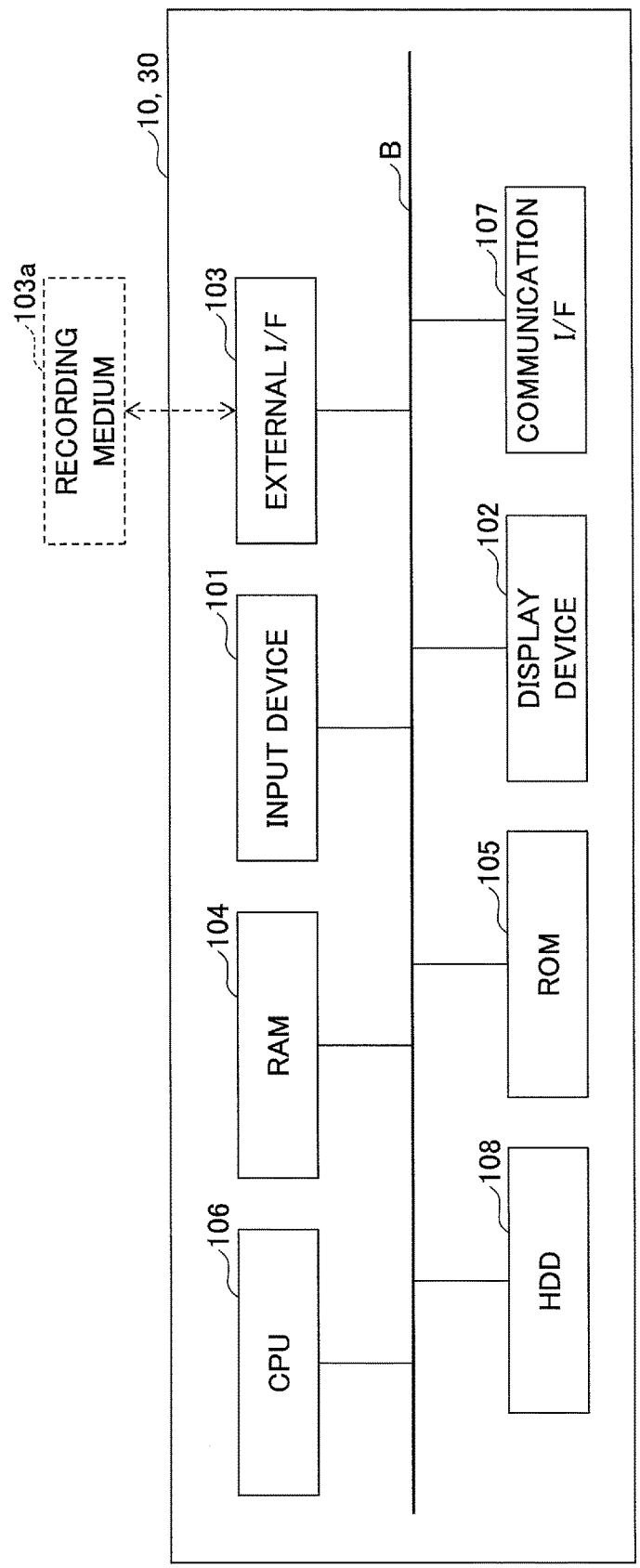
FIG. 2 is a diagram illustrating a hardware configuration of an example of each of a client device and a server apparatus according to an embodiment of the present invention.
Figure 3:
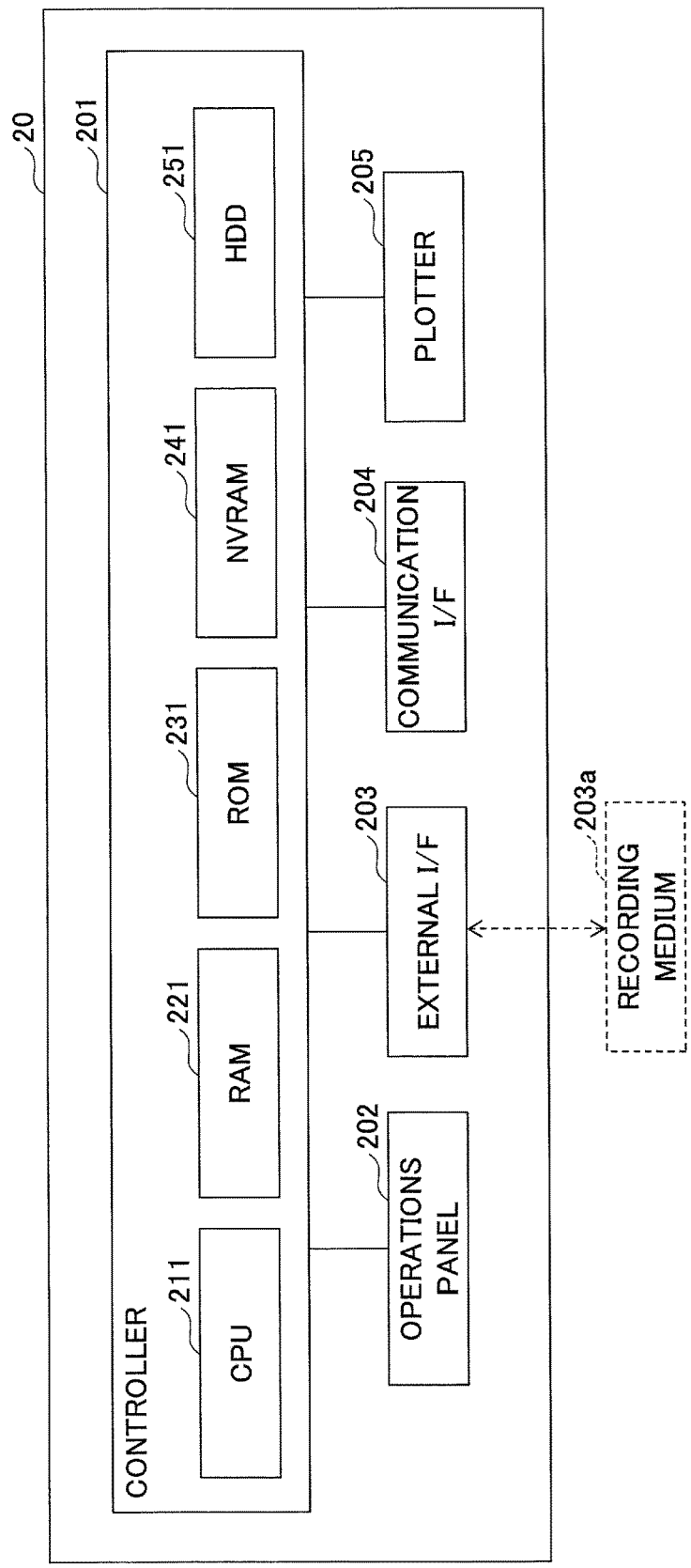
FIG. 3 is a diagram illustrating a hardware configuration of an example of an image forming apparatus according to an embodiment of the present invention.

Next, hardware configurations of the client device 10, the image forming apparatus 20, and the server apparatus 30 that are included in the information processing system 1 according to the embodiment are described by referring to FIG. 2 and FIG. 3.

<<The Client Device 10 and the Server Apparatus 30>>

FIG. 2 is a diagram illustrating hardware configurations of examples of the client device 10 and the server apparatus 30 according to the embodiment. Note that the client device 10 and the server apparatus 30 have similar hardware configurations. Thus, in the following, the hardware configuration of the client device 10 is described.

As illustrated in FIG. 2, the client device 10 according to the embodiment includes an input device 101; a display device 102; an external I/F 103; and a Random Access Memory (RAM) 104. Furthermore, the client device 10 includes a Read Only Memory (ROM) 105; a Central Processing Unit (CPU) 106; a communication I/F 107; and a Hard Disk Drive (HDD) 108. These hardware components are coupled to each other through a bus B.

The input device 101 includes a keyboard, a mouse, and a touch panel; and the input device 101 is used by a user to input various operation signals. The display device 102 includes a display. The display device 102 displays a processing result by the client device 10. Note that at least one of the input device 101 and the display device 102 may be coupled to the client device 10 so as to be used when it is necessary.

The communication I/F 107 is an interface for coupling the client device 10 to the network N. The client device 10 can perform communication through the communication I/F 107.

The HDD 108 is a non-volatile storage device for storing a program and data. As the program and the data stored in the HDD 108, there are an Operating System (OS) that is a system software for controlling the entire client device 10 and an application software that provides various types of functions on the OS.

Note that, instead of the HDD 108, the client device 10 may include a drive device (e.g., a solid state drive (SSD)) that uses a flash memory as the storage medium. Furthermore, the HDD 108 manages the stored program and data by a predetermined file system or a database (DB).

The external I/F 103 is an interface with an external device. The external device includes a recording medium 103a. The client device 10 can read data from and write data in the recording medium 103a through the external I/F 103. Examples of the recording medium 103a include a flexible disk, a Compact Disk (CD), a Digital Versatile Disk (DVD), a SD memory card, and a Universal Serial Bus (USB) memory.

The ROM 105 is a non-volatile semiconductor memory that can maintain a program and data, even if a power source is turned off. The ROM 105 stores an OS setting; a program and data, such as network setting; and a Basic Input/Output System (BIOS) that is executed for activating the client device 10. The RAM 104 is a volatile semiconductor memory for temporarily storing a program and data.

The CPU 106 is a processor that performs control of the entire client device 10 and that implements other functions of the client device 10 by reading out a program and data from a storage device, such as the ROM 105 and the HDD 108, onto the RAM 104, and executing a process based on the program and the data.

Each of the client device 10 and the server apparatus 30 according to the embodiment is provided with the hardware configuration illustrated in FIG. 2, so that various types of processes, which are described below, can be implemented.

<<The Image Forming Apparatus 20>>

FIG. 3 is a diagram illustrating a hardware configuration of an example of the image forming apparatus 20 according to the embodiment.

As illustrated in FIG. 3, the image forming apparatus 20 according to the embodiment includes a controller 201; an operations panel 202; an external interface (I/F) 203; a communication I/F 204; and a plotter 205. Furthermore, the controller 201 includes a Central Processing Unit (CPU) 211; a Random-Access Memory (RAM) 221; a Read-Only Memory (ROM) 231; a Non-Volatile RAM (NVRAM) 241; and a Hard Disk Drive (HDD) 251.

The ROM 231 is a non-volatile semiconductor memory storing various types of programs and data. The RAM 221 is a volatile semiconductor memory that temporarily stores a program and data. The NVRAM 241 stores, for example, setting information. Furthermore, the HDD 251 is a non-volatile storage device that stores various types of programs and data.

The CPU 211 is a processor that implements overall control and other functions of the image forming apparatus 20 by reading out a program, data, setting information, etc., from the ROM 231, the NVRAM 241, and/or the HDD 251 onto the RAM 221 and executing a process based on the program and the data.

The operations panel 202 includes an input unit that receives an input from a user and a display unit that performs display. The external I/F 203 is an interface with an external device. As an example of the external device, there is a recording medium 203a. The image forming apparatus 20 is capable of performing reading out data from and writing data in the recording medium 203a through the external I/F 203. Examples of the recording medium 203a include an IC card, a flexible disk, a Compact Disk (CD), a Digital Versatile Disk (DVD), a Secure Digital (SD) memory card, and a Universal Serial Bus (USB) memory.

The communication I/F 204 is an interface for coupling the image forming apparatus 20 to a network N. The image forming apparatus 20 is capable of communicating through the communication I/F 204. The plotter 205 is a printer for printing print data.

The image forming apparatus 20 according to the embodiment is provided with a hardware configuration illustrated in FIG. 3, so that the image forming apparatus 20 is capable of executing various types of processes described below.

<Software Configuration of the Client Device 10>

Figure 4:
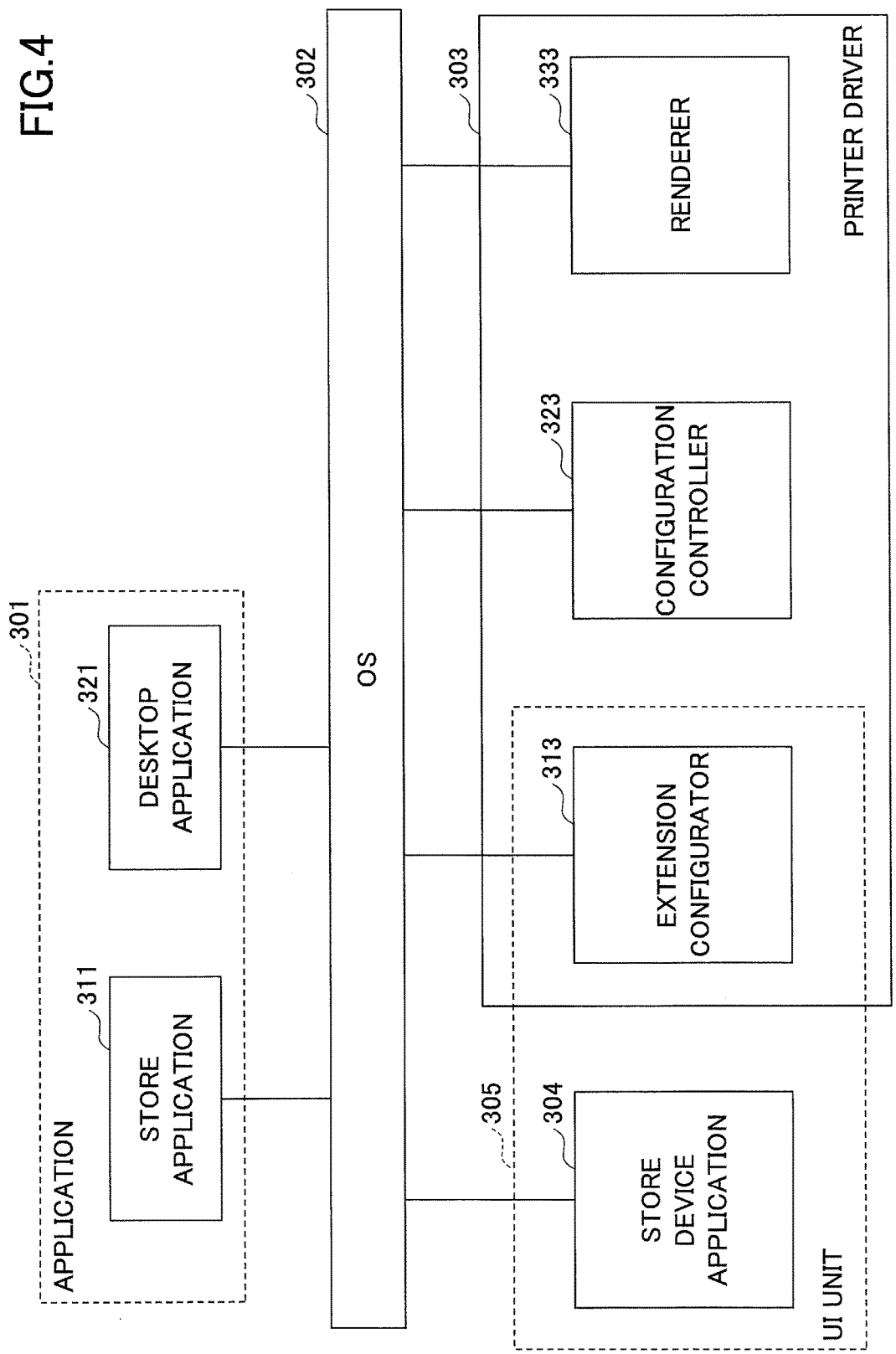
FIG. 4 is a diagram illustrating a software configuration of an example of the client device according to an embodiment of the present invention.

In the following, the software configuration of the client device 10 according to the embodiment is described by referring to FIG. 4. FIG. 4 is a diagram illustrating a software configuration of an example of the client device 10.

As illustrated in FIG. 4, the client device 10 according to the embodiment includes an application 301; an Operating System (OS) 302; a printer driver 303; and a store device application 304.

The application 301 is application software, such as document creation software, image browsing/editing software, and a browser, that is capable of indicating the OS 302 to print, in response to receiving a print instruction from a user. The application 301 includes a store application 311 and a desktop application 321.

The store application 311 is, for example, an application that is available from "Windows Store" that provides applications to Windows (registered trademark) 8/Windows RT and Windows OSs on and subsequent to 8/Windows RT. In the store application 311, a store application User Interface (UI) is used. Note that, in Windows 8 and Windows 8.1, the store application 311 is invoked through a UI provided by the OS 302, which is referred to as "Modern UI" or "Metro UI".

The desktop application 321 is, for example, an application that can be used with an Windows OS on and prior to Windows 7.

The OS 302 is one of the Windows OSs on and subsequent to Windows 8/Windows RT.

The printer driver 303 is, for example, a Version 4 printer driver (which is denoted as "V4 printer driver", hereinafter). A V4 printer driver is based on an architecture adopted from Windows 8/Windows RT. In the following, the printer driver 303 may also be denoted as "V4 printer driver 303".

Note that, in Windows OS on and subsequent to Windows 8, the V4 printer driver can be used, in addition to the Version 3 printer driver (which is denoted as "V3 printer driver" hereinafter), which has been used from Windows 2000 through Windows 7.

The printer driver 303 includes an extension configurator 313; a configuration controller 323; and a renderer 333.

The extension configurator 313 may also be referred to as a printer extension. In response to detecting that the desktop application 321 executes printing, the extension configurator 313 displays a print setting screen specific to a vendor.

The configuration controller 323 may also be referred to as a line-breaking script. For example, the configuration controller 323 verifies whether a combination of print configurations is valid. For example, the extension configurator 313 may hide a combination of print configurations that are unverified by the configuration controller 323.

In response to receiving a request from the application 301 or the OS 302, the configuration controller 323 returns PrintCapability that indicates information about a function that can be configured by the printer driver 303. Furthermore, in response to receiving a request from the application 301 or the OS 302, the configuration controller 323 retrieves, from DevmodePropertyBag, configuration values of respective functions configured in the printer driver 303, and the configuration controller 323 returns PrintTicket indicating the retrieved configuration values. Additionally, the configuration controller 323 stores the configuration values indicated by PrintTicket in DevmodePropertyBag.

Note that PrintCapability and PrintTicket returned to the OS 302 are used, for example, for displaying current values of respective functions and choices in the print setting screen displayed by the extension configurator 313.

In response to detecting, by the application 301, that a print instruction for printing the print target data is received, the renderer 333 creates print data from the print target data.

Upon detecting that the store application 311 is to perform printing, the store device application 304 displays a print setting screen specific to a vendor. Note that, similar to the store application 311, the store device application 304 is available from "Windows store".

Upon detecting that the desktop application 321 is to perform printing, the printer driver 303 may create print data based on the details of the configuration that are made in the print setting screen displayed by the extension configurator 313. In contrast, upon detecting that the store application 311 is to perform printing, the printer driver 303 may create print data based on the details of the configuration that are made in the print setting screen displayed by the store device application 304.

The extension configurator 313 and the store device application 304 form a UI unit 305 for displaying a print setting screen specific to a vendor.

<Storage Area that can be Accessed by the V4 Printer Driver 303 and the Store Device Application 304>

Figure 5:
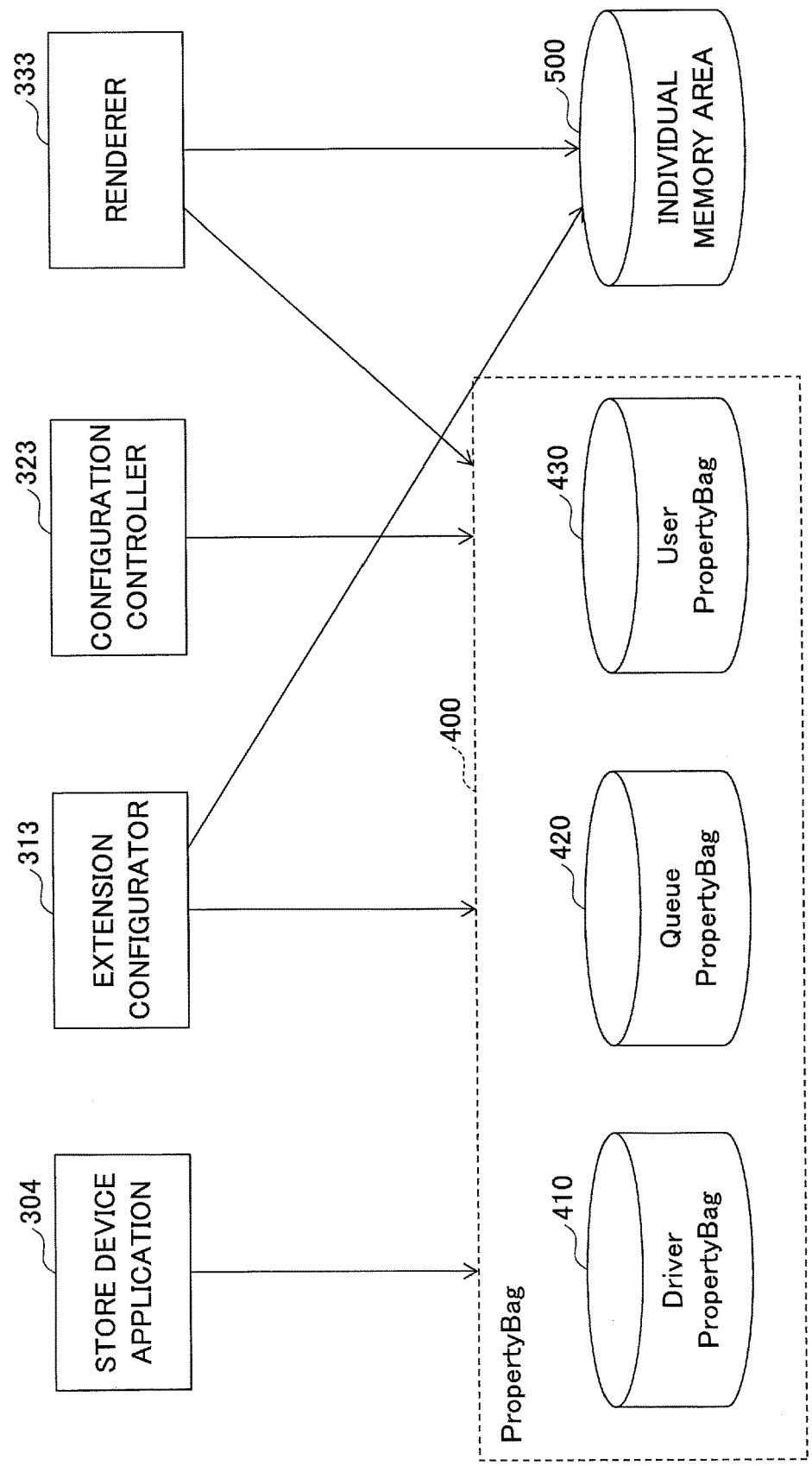
FIG. 5 is a diagram illustrating a storage area accessible by a V4 printer driver and a store device application according to an embodiment of the present invention.

Next, a storage area that can be accessed by the V4 printer driver 303 and the store device application 304 is described by referring to FIG. 5. FIG. 5 is a diagram illustrating the storage area that can be accessed by the V4 printer driver 303 and the store device application 304.

As illustrated in FIG. 5, the extension configurator 313, the configuration controller 323, the renderer 333, and the store device application 304 can access a storage area that is referred to as PropertyBag 400. Note that, such access to the storage area can be executed using an Application Programming Interface (API) provided by the OS 302.

As illustrated in FIG. 5, the PropertyBag 400 includes a DriverPropertyBag 410; a QueuePropertyBag 420; and a UserPropertyBag 430.

The DriverPropertyBag 410 is a storage area for storing setting information that is determined upon creating the V4 printer driver 303. The extension configurator 313, the configuration controller 323, the renderer 333, and the store device application 304 are capable of reading out various types of information from the DriverPropertyBag 410. However, the extension configurator 313, the configuration controller 323, the renderer 333, and the store device application 304 are incapable of writing information in the DriverPropertyBag 410.

The QueuePropertyBag 420 is a storage area for storing setting information for each logical printer (printer icon). The extension configurator 313 and the store device application 304 are capable of reading out various types of information from and writing various types of information in the QueuePropertyBag 420. Furthermore, the configuration controller 323 and the renderer 333 are capable of reading out various types of information from the QueuePropertyBag 420.

Note that a logical printer is, for example, a virtual printer that is displayed as a printer icon in a printer folder of the OS 302. For example, a user of the client device 10 can create, for a single image forming apparatus 20, a plurality of logical printers with respective different configurations (e.g., a document size, an orientation, and print quality).

The UserPropertyBag 430 is a storage area that stores, for each logical printer, setting information for each user. The extension configurator 313, the configuration controller 323, and the store device application 304 are capable of reading out various types of information from and writing various types of information in the UserPropertyBag 430.

Additionally, the extension configurator 313 and the renderer 333 are capable of reading out various types of information from and writing various types of information in an individual memory area 500.

The individual memory area 500 is implemented, for example, using a registry and a file. The individual memory area 500 is a storage area that is different from the PropertyBag 400. The individual memory area 500 is defined by a vendor that provides the V4 printer driver 303.

Due to the restriction applied by the OS 302, the store device application 304 is incapable of accessing a storage area other than the PropertyBag 400. Furthermore, the configuration controller 323 is incapable of accessing a storage area other than the DevmodePropertyBag and the PropertyBag 400, which are described above. Namely, the store device application 304 and the configuration controller 323 are incapable of reading out information from and writing information in the individual memory area 500.

This is the same as the restriction applied to the store application 311. For example, the restriction is for preventing the store device application 304 and the configuration controller 323 from adversely affecting the operation of the OS 302 by changing the registry, etc., used by the OS 302. Such a technique may be referred to as a sandbox.

<Functional Configuration>

(Functional Configuration of Client Device)

Figure 6:
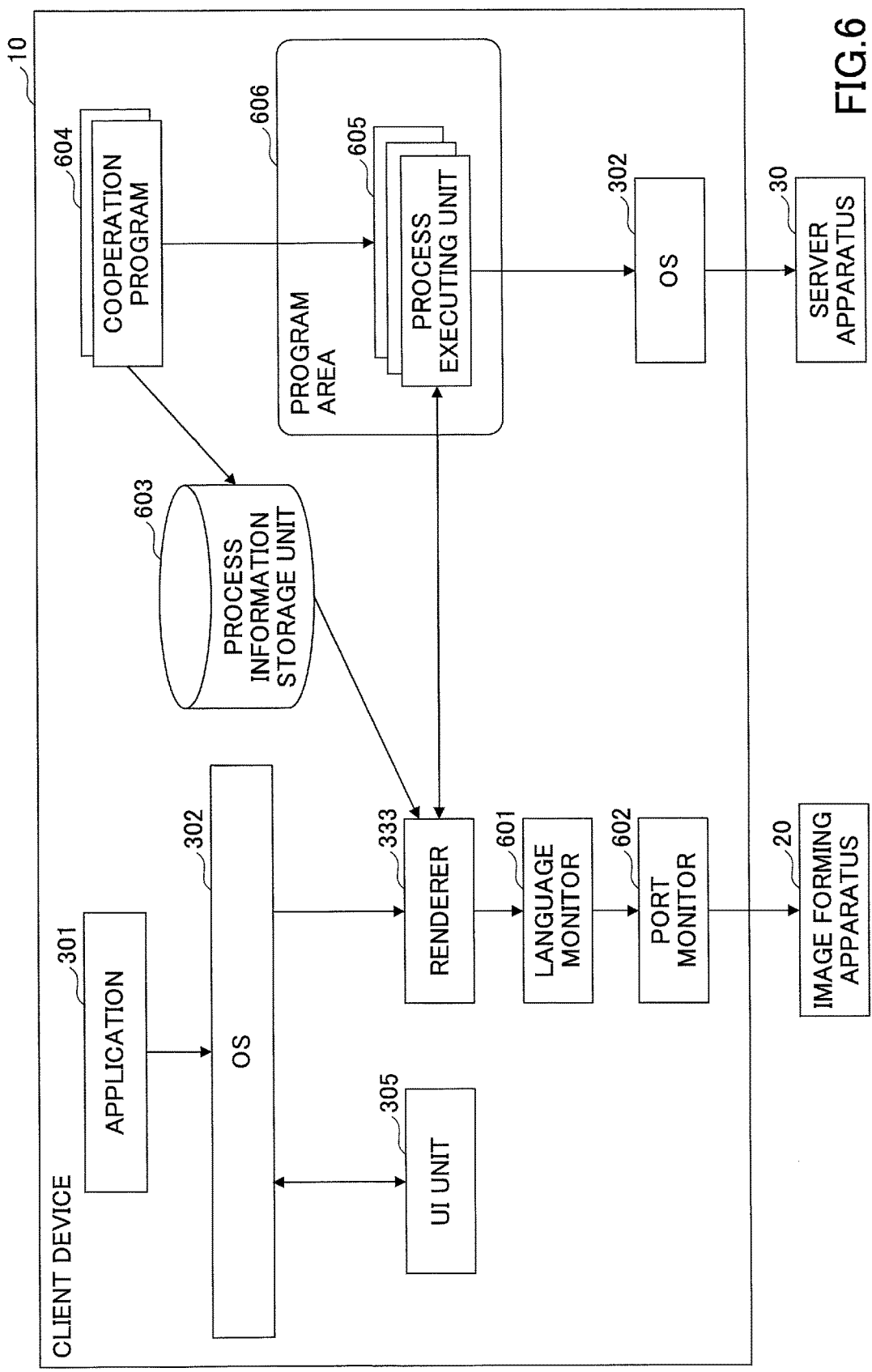
FIG. 6 is a functional block diagram of the client device according to an embodiment of the present invention.

FIG. 6 is a functional block diagram of the client device 10 according to an embodiment.

The client device (information processing apparatus) 10 is coupled to the image forming apparatus (image processing apparatus) 20 and the server apparatus 30 via a network, etc., and executes a printer driver that requests printing (image processing) to the image forming apparatus 20.

By executing programs, for example, by the CPU 106 of FIG. 2, the client device 10 can implement the application 301, the OS 302, the UI unit 305, the renderer 333, a language monitor 601, a port monitor 602, a process information storage unit 603, at least one cooperation program 604, and a plurality of process executing units 605, etc. Among these functions, the application 301, the OS 302, the UI unit 305, and the renderer 333 correspond to the application 301, the OS 302, the UI unit 305, and the renderer 333 illustrated in FIG. 4.

The language monitor 601 is implemented by, for example, a Dynamic Link Library (DLL), etc., executed by the CPU 106, etc., in FIG. 2. The language monitor 601 receives status information indicating, for example, a printing status, etc., from the image forming apparatus 20 that supports bidirectional communication.

The port monitor 602 is implemented by, for example, a DLL, etc., executed by the CPU 106, etc., in FIG. 2. The port monitor 602 performs a print data output process according to the type of printer port (Universal Serial Bus (USB) and Transmission Control Protocol/Internet Protocol (TCP/IP), etc.

The cooperation program 604 is executed by, for example, the CPU 106, etc., in FIG. 2. In cooperation with the printer driver 303 executed by the client device 10, for example, the cooperation program 604 provides various extended functions such as a process of modifying print data (render data), a process of reading the print data, and a process of transferring the print data, etc.

For example, when the cooperation program 604 is installed in the client device 10, the cooperation program 604 arranges (copies) the plurality of process executing units 605 in a program area 606 of the client device 10. Furthermore, the cooperation program 604 stores process information relating to a process executed by each of the plurality of processing execution units 605, in the process information storage unit 603.

The process executing unit 605 is, for example, a plug-in implemented by a DLL, etc., executed by the CPU 106 in FIG. 2. Under the control of the renderer 333, etc., the process executing unit 605 executes, various extended functions such as a process of modifying print data, a process of reading the print data, and a process of transferring the print data, etc.

The process information storage unit (storage) 603 is implemented by, for example, the individual memory area 500 and the QueuePropertyBag 420, etc., in FIG. 5. The process information storage unit 603 stores process information that is information relating to a process executed by each of the plurality of process executing units 605. As an example of the individual memory area 500, for example, a registry HKEY_LOCAL_MACHINE (HKLM), etc., used in a typical normal Windows application, is used.

Subsequently, specific functional configurations and process flows of the client device 10 will be described by exemplifying several embodiments.

First Embodiment

FIG. 7 is a functional block diagram of the renderer 333 and the cooperation program 604 according to a first embodiment.

Functional Configuration of Renderer—First Embodiment

The renderer 333 is implemented by, for example, a program (printer driver 303) executed by the CPU 106 in FIG. 2. The renderer 333 includes a setting information acquiring unit 711, a render data generating unit 712, a process information acquiring unit 713, a determining unit 714, and a requesting unit 715, etc.

For example, the setting information acquiring unit 711 acquires print setting information included in a PrintTicket transferred from the application 301, and the PropertyBag 400 in FIG. 5, etc.

Based on the print setting information acquired by the setting information acquiring unit 711, the render data generating unit 712 converts the data to be the target of printing (image processing) into render data (print data) that can be processed by the image forming apparatus 20.

The process information acquiring unit 713 acquires process information 701 corresponding to the printer driver 303 from the process information storage unit 603. Note that an example of the process information 701 will be described later by referring to FIGS. 8A through 8C.

The determining unit 714 determines the execution order of the processes executed by the plurality of process executing units 605-1 through 605-3 in the printer driver 303, based on the process information 701 acquired by the process information acquiring unit 713. Note that an example of a process of determining the execution order performed by the determining unit 714 will be described later by referring to FIG. 10.

The requesting unit 715 requests the plurality of process executing units 605-1 through 605-3 to execute processes according to the execution order of the processes determined by the determining unit 714. An example of a requesting process by the requesting unit 715 will be described later by referring to FIG. 12.

Functional Configuration of Cooperation Program—First Embodiment

The cooperation program 604 is implemented by, for example, a program executed by the CPU 106 in FIG. 2. The cooperation program 604 includes a process information saving unit 721, an arranging unit 722, and a processing unit 723, etc.

For example, when the cooperation program 604 is installed in the client device 10, the arranging unit 722 arranges the plurality of process executing units 605-1 through 605-3, which execute various extended functions, in the program area 606 of the client device 10. For example, the arranging unit 722 copies the plurality of process executing units 605-1 through 605-3 into the program area 606 of the client device 10 so as to be accessible from the renderer 333 of the printer driver 303.

Note that in the following description, the "process executing unit 605" is used to indicate any process executing unit 605 among the plurality of process executing units 605-1 through 605-3. Furthermore, the number of the process executing units 605 illustrated in FIG. 7 is one example, and the number of the process executing units 605 may be another number that is-two or more.

The process information saving unit 721 stores, in the process information storage unit 603, the process information 701 that is information relating to a process executed by each of the plurality of process executing units 605-1 through 605-3 arranged in the program area 606 by the arranging unit 722.

The processing unit 723 executes various processes to be executed by the cooperation program 604; for example, a setting process of the cooperation program 604, a log collection process, and an adjustment process with other cooperation programs, etc.

Functional Configuration of Process Executing Unit—First Embodiment

The process executing unit 605 is implemented by, for example, a program (DLL, etc.) executed by the CPU 106 in FIG. 2. The process executing unit 605 includes a process control unit 731 and a processing unit 732, etc.

The processing unit 732 executes at least one process among, for example, a modifying process (first process) of modifying the print data (render data), a reading process (second process) of reading information from the print data, and a transferring process of transferring the print data (third process).

The process control unit 731 accepts a process request from the renderer 333, and causes the processing unit 732 to execute a process in accordance with the accepted processing request.

Example of Process Performed by Process Executing Unit—First Embodiment

Table 1 indicates examples of processes executed by the process executing unit 605.

TABLE 1

| PROCESS TYPE | PROCESS CONTENT | EXAMPLE OF PROCESS CONTENT |
| --- | --- | --- |
| MODIFY | MODIFY PRINT DATA | COLOR → MONOCHROME CONVERSION PROCESS, AUTHENTICATION PROCESS, PROCESS OF MASKING USER NAME, ETC. |
| READ | REFER TO PRINT DATA | LOG COLLECTION PROCESS, PREVIEW PROCESS, ACCOUNTING PREDICTION PROCESS, ETC. |
| TRANSFER | TRANSFER PRINT DATA | PROCESS OF SAVING IN SHARED FOLDER, PROCESS OF UPLOADING TO CLOUD, PROCESS OF RETURNING TO PRINTER DRIVER, ETC. |

As indicated in Table 1, the processes executed by the process executing unit 605 are divided into three process types; for example, modifying (Modify), reading (Read), and transferring (Transfer).

The process of the process type of "Modify" (hereinafter referred to as a "modifying process") includes a process of modifying print data as a process content; for example, a color→monochrome conversion process, and an authentication process, etc.

The process of the process type of "Read" (hereinafter referred to as a "reading process") includes a process of referring to print data (acquisition of information) as a process content; for example, a log collection process, an accounting prediction process, and a preview process.

The process of the process type "transfer" (hereinafter referred to as a "transferring process") includes a process for transferring print data as a process content; for example, a process of saving the print data in a shared folder, a process of uploading the print data to cloud, and a process of returning the print data to the printer driver 303, etc.

Example of Process Information—First Embodiment

FIGS. 8A through 8C illustrate examples of process information according to the first embodiment. FIG. 8A illustrates an example of an image of process information 810 of a modifying process. The process information 810 of the modifying process includes information 811 indicating the name of the process executing unit 605, information 812 indicating the path where the process executing unit 605 is stored, information 813 indicating the process type of the process executing unit 605, etc. As illustrated in FIG. 8A, a character string "modify" is included in the information 813 indicating the process type of the process information 810 of the modifying process.

FIG. 8B illustrates an example of an image of process information 820 of the reading process. The information indicating the process type of the process information 820 of the reading process includes a character string "read". Similarly, FIG. 8C illustrates an example of an image of process information 830 of the transferring process. The information indicating the process type of the process information 830 of the transferring process includes the character string "transfer".

In the above description, it is assumed that the printer driver 303 is a V4 printer driver; however, these configurations are not limited to the V4 printer driver, and by using the same configuration with the V3 printer driver, the effects of the present embodiment can be obtained. When the printer driver 303 is a V3 printer driver, a registry HKLM can be used as the process information storage unit 603 in FIG. 7.

Process Flow—First Embodiment

Next, the process flow of an information processing method according to the first embodiment will be described.

Process of Renderer—First Embodiment

Figure 9:
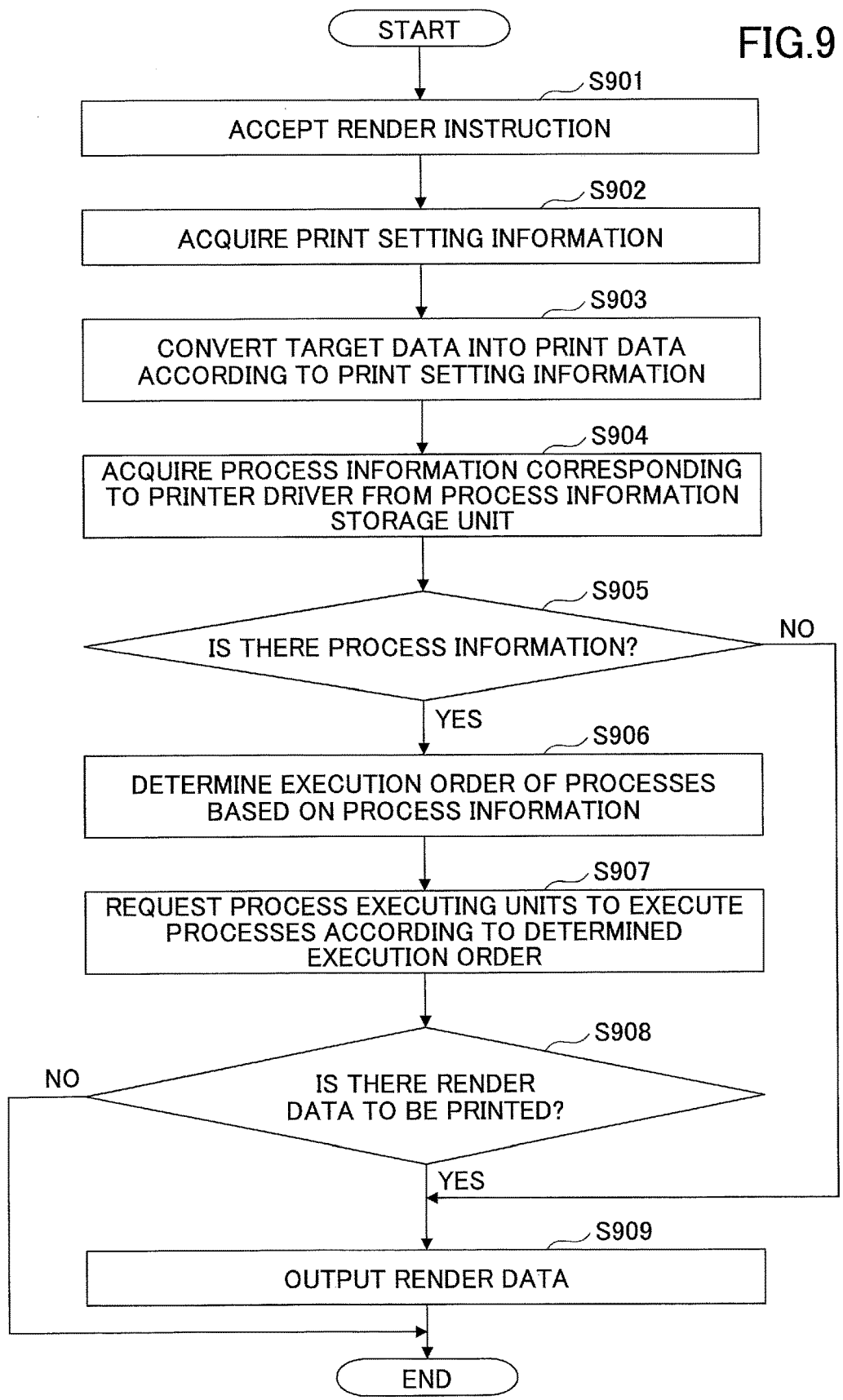
FIG. 9 is a flowchart of an example of the process by the renderer according to the first embodiment of the present invention.

FIG. 9 is a flowchart of an example of the process by the renderer 333 according to the first embodiment. This process indicates an example of a process executed when the renderer 333 of the printer driver 303 accepts a render instruction for requesting printing, from the application 301, etc.

In step S901, when the renderer 333 accepts a render instruction from the application 301, etc., the renderer 333 executes the processes of step S902 and onward.

In step S902, the setting information acquiring unit 711 of the renderer 333 acquires print setting information. For example, the setting information acquiring unit 711 acquires print setting information from PrintTicket, etc., which is print setting information transferred from the application 301.

In step S903, the render data generating unit 712 of the renderer 333 converts data to be the target of printing into print data (render data) that can be printed by the image forming apparatus 20, in accordance with the print setting information acquired by the setting information acquiring unit 711.

In step S904, the process information acquiring unit 713 of the renderer 333 acquires the process information 701 corresponding to the printer driver 303 from the process information storage unit 603.

Note that the processes of steps S904 through S906 may be performed in parallel with the process of step S903.

In step S905, the renderer 333 causes the process to branch, depending on whether the process information acquiring unit 713 has acquired the process information 701 (whether the process information 701 is present).

When the process information acquiring unit 713 has acquired the process information 701 corresponding to the printer driver 303 from the process information storage unit 603, that is, when there is the process information 701 corresponding to the printer driver 303, the renderer 333 proceeds to the process of step S906.

Conversely, when the process information acquiring unit 713 has not acquired the process information 701 corresponding to the printer driver 303 from the process information storage unit 603, that is, when there is no process information 701 corresponding to the printer driver 303, the renderer 333 proceeds to the process of step S909.

In step S906, the determining unit 714 of the renderer 333 determines the execution order of the processes executed by the plurality of process executing units 605 in the printer driver 303, based on the process information 701 acquired by the process information acquiring unit 713.

In step S907, the requesting unit 715 of the renderer 333 requests the plurality of process executing units 605 to execute processes according to the execution order determined by the determining unit 714. Accordingly, execution of various extended functions with respect to the print data is implemented.

In step S908, the renderer 333 determines whether there is print data (render data) to be printed.

For example, in step S907, when the process executing unit 605 does not return the print data to the renderer 333, for example, when the process executing unit 605 transfers the print data to the server apparatus 30, the renderer 333 determines that there is no print data for which printing is to be executed. In this case, the renderer 333 ends the process.

Conversely, when the process execution unit 605 returns the print data to the renderer 333 in step S907, the renderer 333 determines that there is print data to be printed. In this case, the renderer 333 outputs the print data (render data) to the image forming apparatus 20 in step S909.

By the above process, the renderer 333 of the printer driver 303 can cause various processes (extended functions) to be executed on the print data, by using the plurality of process executing units 605.

Process of Determining Execution Order—First Embodiment

The determining unit 714 determines the execution order of the processes executed by the plurality of process executing units 605 according to information of the execution order and the execution method as illustrated in Table 2, for example.

TABLE 2

| PROCESS TYPE | EXECUTION ORDER | EXECUTION METHOD |
|---|---|---|
| MODIFY | BEFORE READING AND TRANSFERRING | SERIAL |
| READ | BEFORE TRANSFERRING, AFTER MODIFYING | PARALLEL OR SERIAL |
| TRANSFER | AFTER MODIFYING AND READING | PARALLEL OR SERIAL |

In the example of Table 2, the execution order is defined such that the modifying process executed before the reading process and the transferring process. This is because, in the reading process, it is necessary to read the information after executing the modifying process, and in the transferring process, it is necessary to transfer the print data after executing the modifying process. Furthermore, the execution method is defined such that the modifying processes are to be executed in series, that is, it is defined that the plurality of processes are to be sequentially executed. This is because in order to apply all of the modifications to the print data, it is necessary to sequentially execute the processes with respect to the print data.

Furthermore, in the example of Table 2, the execution order is defined such that the reading process is executed before the transferring process and after the modifying process. This is because in the reading process, the information after executing the modifying process needs to be read, and there is a possibility that the printing data will be deleted when the transferring process is performed. Furthermore, the execution method is defined such that the reading processes can be executed in parallel or in series, that is, it is possible to execute a plurality of processes in parallel. This is because the print data is not modified in the reading process, and therefore there is no problem even if multiple pieces of information are read in parallel.

Furthermore, in the example of Table 2, the execution order is defined such that the transferring process is executed after the modifying process and the reading process. This is because, in the transferring process, it is necessary to transfer the print data that has been modified and read. Furthermore, the execution method is defined such that the transferring processes can be executed in parallel or in series, that is, it is possible to execute a plurality of processes in parallel. This is because the content of the print data is not modified in the transferring process, and therefore there is no problem even if the print data is transmitted in parallel to a plurality of transfer destinations.

Figure 10:
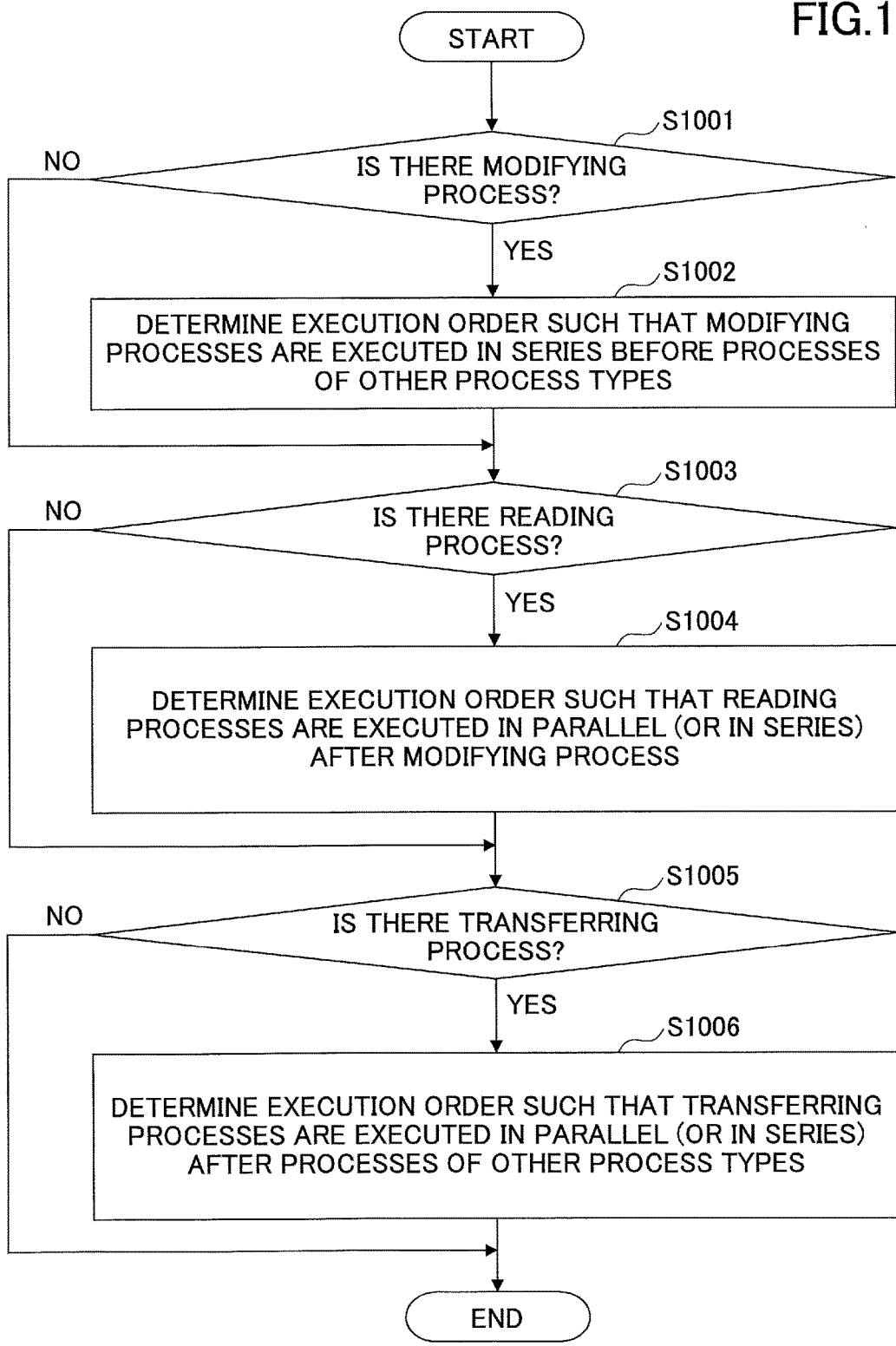
FIG. 10 is a flowchart of an example of an execution order determination process according to the first embodiment of the present invention.

FIG. 10 is a flowchart of an example of an execution order determination process according to the first embodiment. This process indicates an example in which the determining unit 714 of the renderer 333 determines the execution order of the processes executed by the plurality of process executing units 605, according to information of the execution order and the execution method indicated in Table 2, in step S906 of FIG. 9.

In step S1001, the determining unit 714 of the renderer 333 determines whether there is a modifying process in the process information 701 acquired by the process information acquiring unit 713. For example, as illustrated in FIG. 8A, the determining unit 714 determines whether there is the process information 810 of a modifying process including the character string "modify" in the information 813 indicating the process type.

When there is no modifying process, the determining unit 714 proceeds to the process of step S1003. Conversely, when there is modifying process, the determining unit 714 proceeds to the process of step S1002.

In step S1002, the determining unit 714 determines the execution order so as to execute the modifying process included in the process information 701 acquired by the process information acquiring unit 713, before the other process types (reading process and transferring process). Furthermore, when there are a plurality of modifying processes, the determining unit 714 determines the execution order of the plurality of modifying processes so as to execute the plurality of modifying processes serially (sequentially). Note that, for example, the execution order of the plurality of modifying processes is determined according to the order described in the process information 701.

In step S1003, the determining unit 714 of the renderer 333 determines whether there is a reading process in the process information 701 acquired by the process information acquiring unit 713. For example, as illustrated in FIG. 8B, the determining unit 714 determines whether there is the process information 820 of the reading process including the character string "read" in the information indicating the process type.

If there is no reading process, the determining unit 714 proceeds to the process of step S1005. Conversely, when there is a reading process, the determining unit 714 proceeds to the process of step S1004.

In step S1004, the determining unit 714 determines the execution order of the processes such that the reading process included in the process information 701 acquired by the process information acquiring unit 713 is executed after the modifying process. Furthermore, when there are a plurality of reading processes, the determining unit 714 determines the execution order of the plurality of reading processes so as to execute the plurality of reading processes in parallel or in series.

Preferably, when there are a plurality of reading processes, the determining unit 714 determines the execution order of the plurality of reading processes such that the plurality of reading processes are executed in parallel.

In step S1005, the determining unit 714 of the renderer 333 determines whether there is a transferring process in the process information 701 acquired by the process information acquiring unit 713. For example, as illustrated in FIG. 8C, the determining unit 714 determines whether the process information 830 of the transferring process including the character string "transfer", is included in the information indicating the process type.

When there is no transferring process, the determining unit 714 ends the process. Conversely, when there is a transferring process, the determining unit 714 proceeds to the process of step S1006.

In step S1006, the determining unit 714 determines the execution order of the processes such that the transferring process included in the process information 701 acquired by the process information acquiring unit 713 to be executed after the processes of other process types (modifying process and reading process). Furthermore, when there are a plurality of transferring processes, the determining unit 714 determines the execution order of the plurality of transferring processes so as to execute the plurality of transferring processes in parallel or in series.

Preferably, when there are a plurality of transferring processes, the determining unit 714 determines the execution order of the plurality of transferring processes so as to execute the plurality of transferring processes in parallel.

By the above process, the execution order of the processes executed by the plurality of process executing units 605 is determined.

FIGS. 11A and 11B are diagrams illustrating examples of the execution order of processes according to the first embodiment. FIG. 11A illustrates an image of an example of process information 1110 to be executed in series. As illustrated in FIG. 11A, the process information items (modifying processes 1112 and 1113) to be executed in series are listed, for example, via a comma ",", in square brackets 1111.

Furthermore, FIG. 11B illustrates an image of an example of process information 1120 to be executed in parallel. As illustrated in FIG. 11B, each of the process information items (reading processes 1122 and 1124) to be executed in parallel is closed with square brackets 1121 and 1123 and listed via a comma ",".

For example, the determining unit 714 creates process information in which the execution order is determined by, for example, listing process information in series or in parallel as described above.

Note that the process illustrated in FIG. 10 is an example of an execution order determination process performed by the determining unit 714. For example assuming that the determining unit 714 determines the execution order of processes to be in the order of processes (modifying→reading→transferring) as illustrated in FIG. 10, at the stage where the execution order of a process by one of the process executing units 605 is determined, the requesting unit 715 may invoke the process executing unit 605.

In this case, when determining the execution order of the modifying process, after the completion of the modifying process executed by the process executing unit 605 that has been requested to execute the modifying process, the determining unit 714 determines the process executing unit 605 to be requested to execute the next process.

As another example, the determining unit 714 may determine which one of the process executing units 605 is to be requested to execute the next modifying process, without waiting for completion of the modifying process executed by the process executing unit 605 previously requested to execute the modifying process. In this case, the requesting unit 715 requests the next process executing unit 605 to execute the process, after waiting for completion of the modifying process executed by the process executing unit 605 previously requested to execute the modifying process.

Furthermore, when determining the execution order of the reading process, the determining unit 714 determines the process executing unit 605 to be requested to execute the next reading process, without waiting for the completion of the reading process performed by the process executing unit 605 previously requested to execute the reading process.

Furthermore, when determining the execution order of the transferring process, similar to the case of determining the execution order of the reading process, the determining unit 714 determines the process executing unit 605 to be requested to execute the next transferring process, without waiting for the completion of the transferring process executed by the process executing unit 605 previously requested to execute the transferring process.

Requesting Process—First Embodiment

Figure 12:
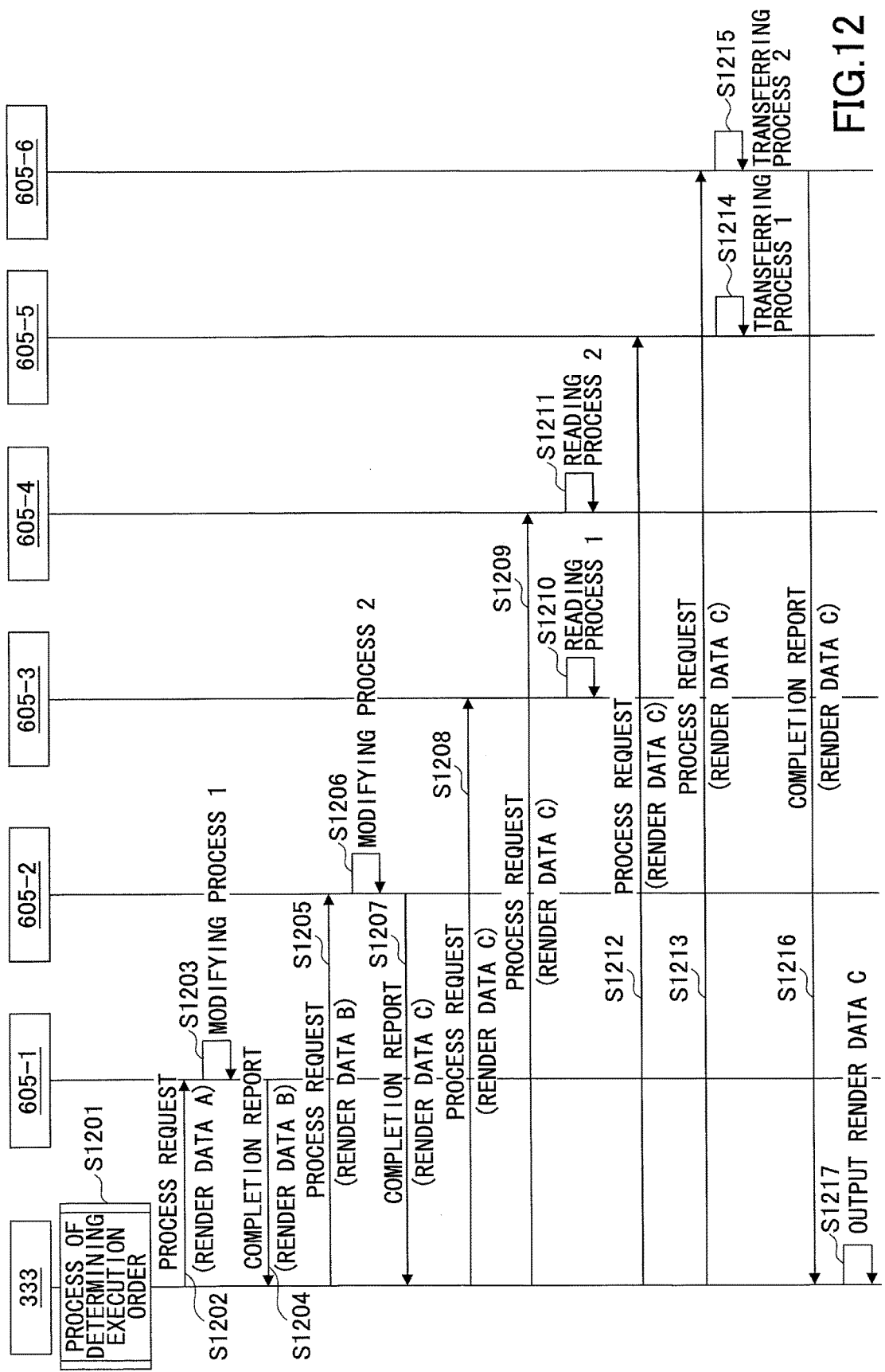
FIG. 12 is a sequence diagram of an example of a requesting process according to the first embodiment of the present invention.

FIG. 12 is a sequence diagram of an example of a requesting process according to the first embodiment. This process indicates an example in which the requesting unit 715 requests the execution of processes to the plurality of process executing units 605-1 through 605-6 according to the execution order determined by the determining unit 714 in step S907 of FIG. 9. Here, an example of a requesting process in a case where there are two of each of the modifying processes, the reading processes, and the transferring processes, is illustrated.

In step S1201, the determining unit 714 of the renderer 333 executes, for example, an execution order determination process as illustrated in FIG. 10.

In step S1202, the requesting unit 715 of the renderer 333 sends a process request for requesting the process executing unit 605-1 to execute a modifying process 1 (for example, color→monochrome conversion, etc.) in accordance with the execution order determined by the determining unit 714. This process request includes the render data (hereinafter referred to as "render data A") generated by the render data generating unit 712.

In step S1203, the process executing unit 605-1 executes the modifying process 1 on the render data A in accordance with the process request, and generates render data (hereinafter referred to as "render data B") on which the modifying process 1 has been executed.

In step S1204, the process executing unit 605-1 returns a completion report indicating that the modifying process 1 has been completed, to the renderer 333. This completion report includes, for example, the render data B.

In step S1205, the requesting unit 715 of the renderer 333 sends a process request for requesting the process executing unit 605-2 to execute a modifying process 2 (for example, a masking process of masking the user name) according to the execution order determined by the determining unit 714. This process request includes the render data B on which the modifying process 1 has been executed.

In step S1206, the process executing unit 605-2 executes the modifying process 2 on the render data B in accordance with the process request, and generates render data (hereinafter referred to as "render data C") on which the modifying process 1 and the modifying process 2 have been executed.

In step S1207, the process executing unit 605-2 returns a completion report indicating that the modifying process 2 has been completed, to the renderer 333. This completion report includes, for example, the render data C.

In this manner, the requesting unit 715 sequentially requests the process executing units 605-1 and 605-2 that execute modifying processes, to execute modifying processes, and generates the render data C on which the modifying process 1 and the modifying process 2 have been executed.

In step S1208, the requesting unit 715 of the renderer 333 sends a process request for requesting the process executing unit 605-3 to execute a reading process 1 (for example, a log collection process, etc.) in accordance with the execution order determined by the determining unit 714. This process request includes the render data C on which the modifying process 1 and the modifying process 2 have been executed.

In step S1209, the requesting unit 715 of the renderer 333 sends a process request for requesting the process executing unit 605-4 to execute a reading process 2 (for example, an accounting prediction process, etc.) in parallel with the process of step S1208. This process request includes the render data C on which the modifying process 1 and the modifying process 2 have been executed.

In step S1210, the process executing unit 605-3 executes the reading process 1. Furthermore, in step S1211, the process executing unit 605-4 executes the reading process 2 in parallel with the process of step S1210.

In this manner, the requesting unit 715 can send process requests for requesting reading processes in parallel, to the process executing units 605-3 and 605-4 that execute reading processes.

Furthermore, after sending the process requests to the process executing units 605-3 and 605-4 that execute reading processes, the requesting unit 715 may send process requests to the process executing units 605-5 and 605-6 that execute transferring processes, without waiting for a response.

In step S1212, the requesting unit 715 of the renderer 333 sends a process request for requesting the process executing unit 605-5 to execute a transferring process 1 (for example, a process of returning the render data to the renderer 333 after saving the render data in the shared folder), according to the execution order determined by the determining unit 714. This process request includes the render data C on which the modifying process 1 and the modifying process 2 have been executed.

In step S1213, the requesting unit 715 of the renderer 333 sends a process request for requesting the the process executing unit 605-6 to execute a transferring process 2 (for example, uploading to the cloud), in parallel with the process of step S1212. This process request includes the render data C on which the modifying process 1 and the modifying process 2 have been executed.

In step S1214, the process executing unit 605-5 executes the transferring process 1. In step S1215, the process executing unit 605-6 executes the transferring process 2 in parallel with the process of step S1214.

In step S1216, the process executing unit 605-6 sends a completion report including the render data C to the renderer 333.

In step S1217, the renderer 333 outputs the render data C to the image forming apparatus 20 via the language monitor 601 and the port monitor 602, etc.

In this manner, the requesting unit 715 of the renderer 333 requests execution of processes to the plurality of process executing units 605-1 through 605-6 according to the execution order determined by the requesting unit 715.

According to the present embodiment, in the V4 printer driver or the printer driver 303 having similar restrictions, it is possible to easily add an extended function unique to the printer driver 303 while maintaining the convenience of the user.

Second Embodiment

In a second embodiment, an example in which a user can select a process to be executed on render data (print data), among processes executed by the plurality of process executing units 605, will be described.

Functional Configuration—Second Embodiment

Figure 13:
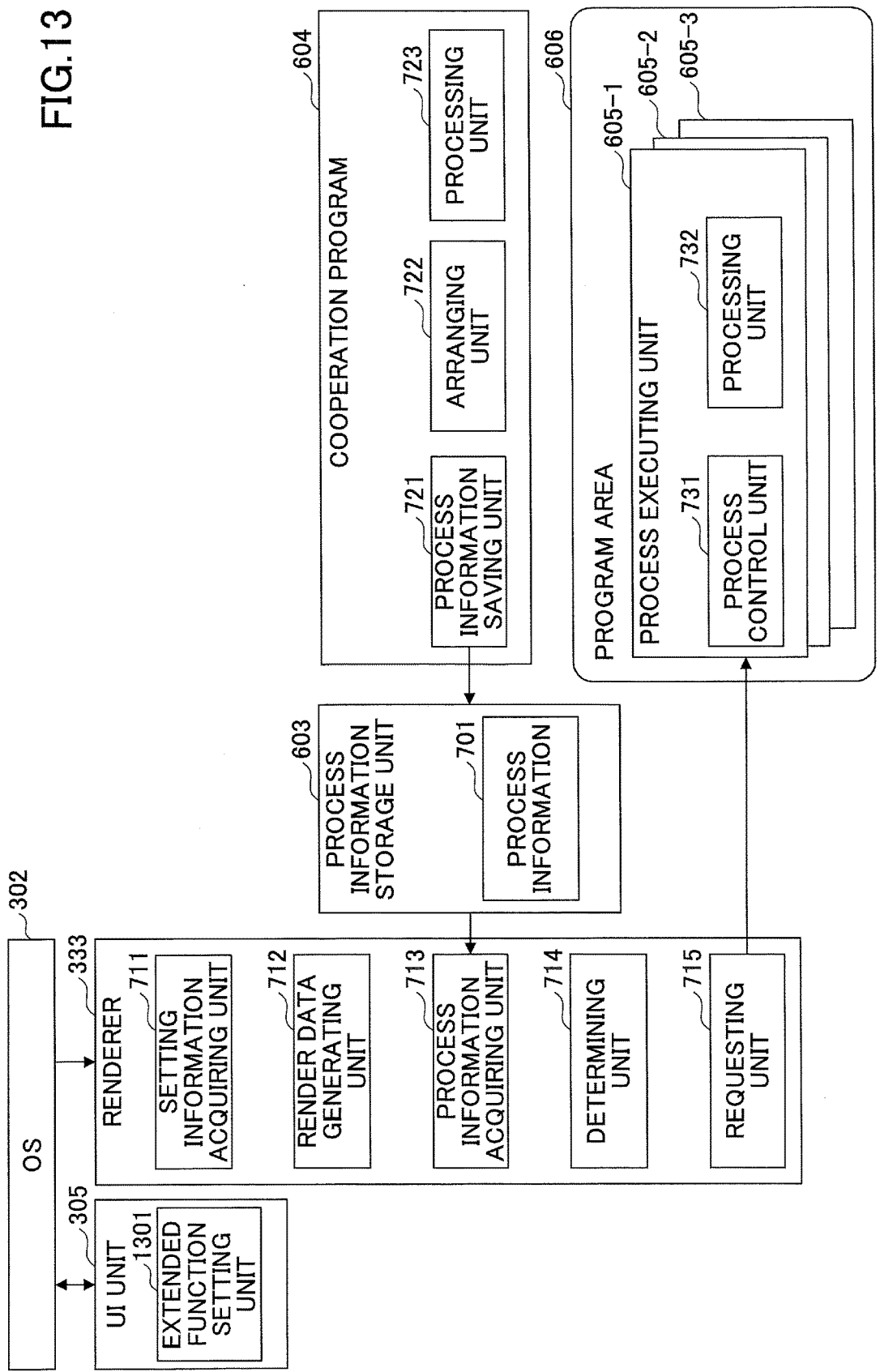
FIG. 13 is a functional block diagram of the renderer, a user interface (UI) unit, and the cooperation program according to a second embodiment of the present invention.

FIG. 13 is a functional block diagram of the renderer 333, the UI unit 305, and the cooperation program 604 according to the second embodiment. The functional block diagram of FIG. 13 includes the UI unit 305 in addition to the functional block diagram of the first embodiment of FIG. 7. The configurations of the renderer 333, the cooperation program 604, the plurality of process executing units 605, and the process information storage unit 603, etc., illustrated in FIG. 13 are the same as those of the first embodiment illustrated in FIG. 7, and therefore mainly the differences from the first embodiment will be described.

The UI unit 305 corresponds to the UI unit 305 illustrated in FIG. 4, and includes an extended function setting unit 1301.

The extended function setting unit 1301 provides a setting screen for selecting a process to be executed on the render data (print data) generated by the render data generating unit 712, from among the processes executed by the plurality of process executing units 605.

Figure 14A:
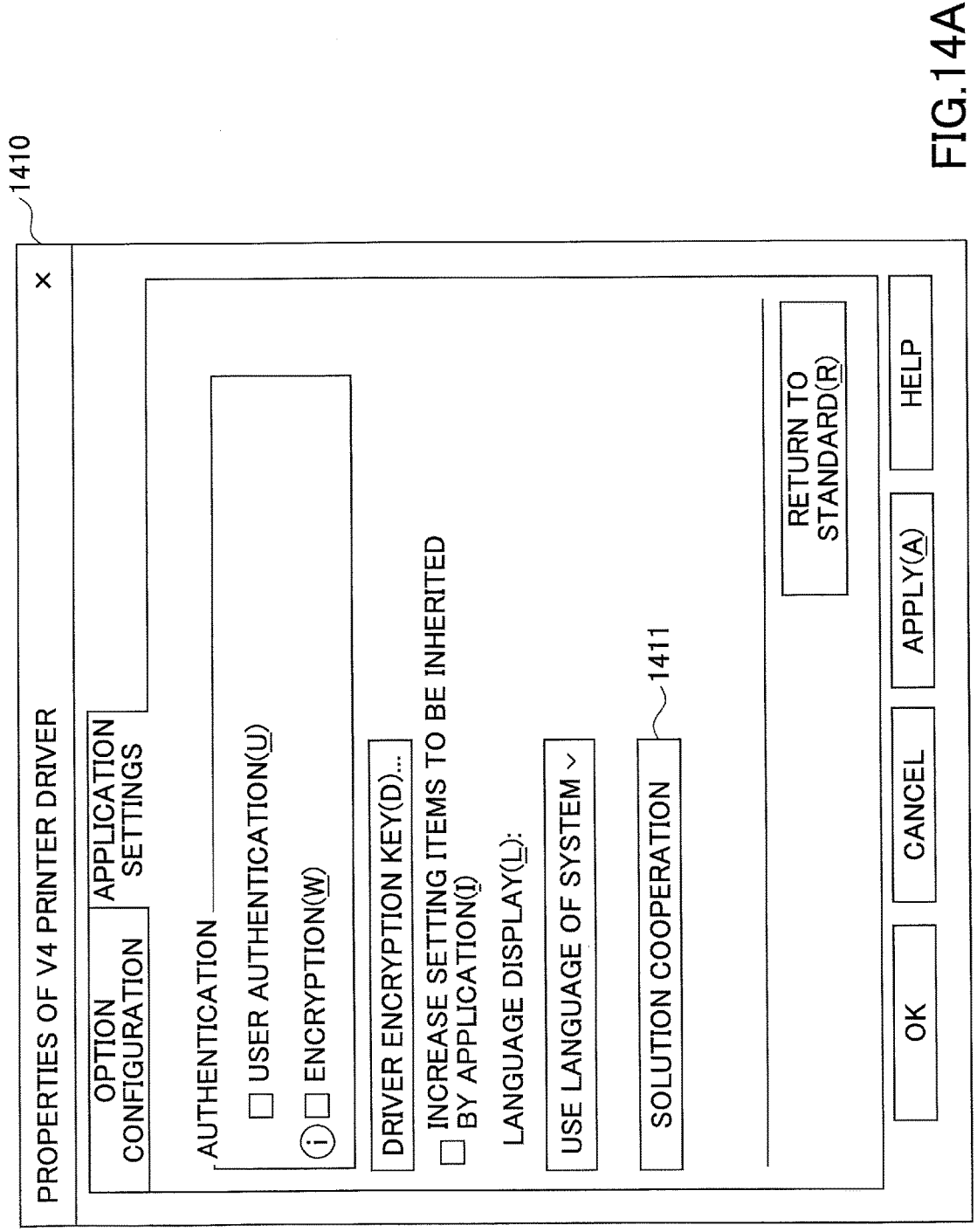

For example, the extended function setting unit 1301 is invoked from a list of operations displayed on a context menu displayed when the logical printer icon is right-clicked, and for example, setting screens as illustrated in FIGS. 14A and 14B are displayed on the display device 102.

FIGS. 14A and 14B are diagrams illustrating examples of a setting screen according to the second embodiment.

FIG. 14A illustrates an example of an extended function setting screen 1410 displayed by the extended function setting unit 1301. The extended function setting screen 1410 includes a "solution cooperation" button 1411 for making settings relating to the cooperation program 604. By selecting the "solution cooperation" button 1411, the user can display, for example, an extended function selection screen 1420 as illustrated in FIG. 14B.

In the extended function selection screen 1420 illustrated in FIG. 14B, a list 1421 of processes executable by the plurality of process executing units 605 is displayed, and the user selects whether to execute a process by a check box 1422 of each process. The example of FIG. 14B illustrates a case where settings are made such that the processes having the process names "monitor data" and "transfer to cloud" are executed and the process of "individual authentication" is not executed.

As described above, in the second embodiment, the user selects, from among the processes executed by the plurality of process executing units 605, the process to be executed, using the extended function selection screen 1420 as illustrated in FIG. 14B.

Process Flow—Second Embodiment

Example of Printing Process—Second Embodiment

FIG. 15 is a sequence diagram of an example of a printing process according to the second embodiment. This process indicates the overall flow of a printing process. It is assumed that at the start of FIG. 15, one or more cooperation programs 604 are installed in the client device 10.

In step S1501, the application 301 requests the OS 302 to confirm the print setting.

In step S1502, the OS 302 requests the configuration controller (line-breaking script) 323 to acquire the setting information using an API such as ValidatePrintTicket.

In step S1503, the configuration controller 323 acquires setting values of various functions set in the printer driver 303, and generates PrintTicket indicating the acquired setting value.

In step S1504, the configuration controller 323 sends, to the OS 302, a completion report including the generated PrintTicket.

In step S1505, the OS 302 sends, to the application 301, the completion report including PrintTicket.

By the above process, the application 301 can acquire the present setting information of the printer driver 303. Furthermore, when the application 301 sets (modifies) the setting information, the application 301 executes the processes of steps S1506 through S1514.

In step S1506, the application 301 requests the OS 302 to display the print setting.

In step S1507, the OS 302 requests the configuration controller 323 to acquire setting information.

In step S1508, the configuration controller 323 generates PrintTicket, and in step S1509, the configuration controller 323 sends, to the OS 302, a completion report including PrintTicket.

In step S1510, the OS 302 sends an activation request for requesting the UI unit 305 to display the setting screen. This activation request includes the PrintTicket acquired in step S1509.

In step S1511, the UI unit 305 displays the setting information setting screen, and in step S1512, the UI unit 305 accepts the setting operation by the user. For example, the extended function setting unit 1301 of the UI unit 305 accepts an operation of selecting an extended function in the extended function selection screen 1420 as illustrated in FIG. 14B.

By accepting the setting operation of the extended function at this timing, it is possible to change the process for each job with one logical printer, for example, whether to change between transferring for each job or performing regular printing.

In step S1513, the UI unit 305 sends, to the OS 302, a completion report including the PrintTicket in which the modification in the setting information is applied.

In step S1514, the OS 302 sends, to the application 301, the completion report including the PrintTicket in which the modification in the setting information is applied.

By the above process, the application 301 can acquire setting information including information of the process to be executed, among processes executed by the plurality of process executing units 605.

In step S1515, the application 301 requests the OS 302 to execute printing by using the PrintTicket acquired in step S1514.

In step S1516, the OS 302 sends a rendering instruction including the PrintTicket reported from the application 301, to the renderer 333 of the printer driver 303.

In step S1517, the renderer 333 of the printer driver 303 executes the process of the renderer as illustrated in FIG. 9, for example.

In the second embodiment, in step S907 of FIG. 9, the requesting unit 715 of the renderer 333 requests the plurality of process executing units 605 to execute processes, based on the execution order determined by the determining unit 714 and the setting information acquired by the setting information acquiring unit 711.

Figure 16:
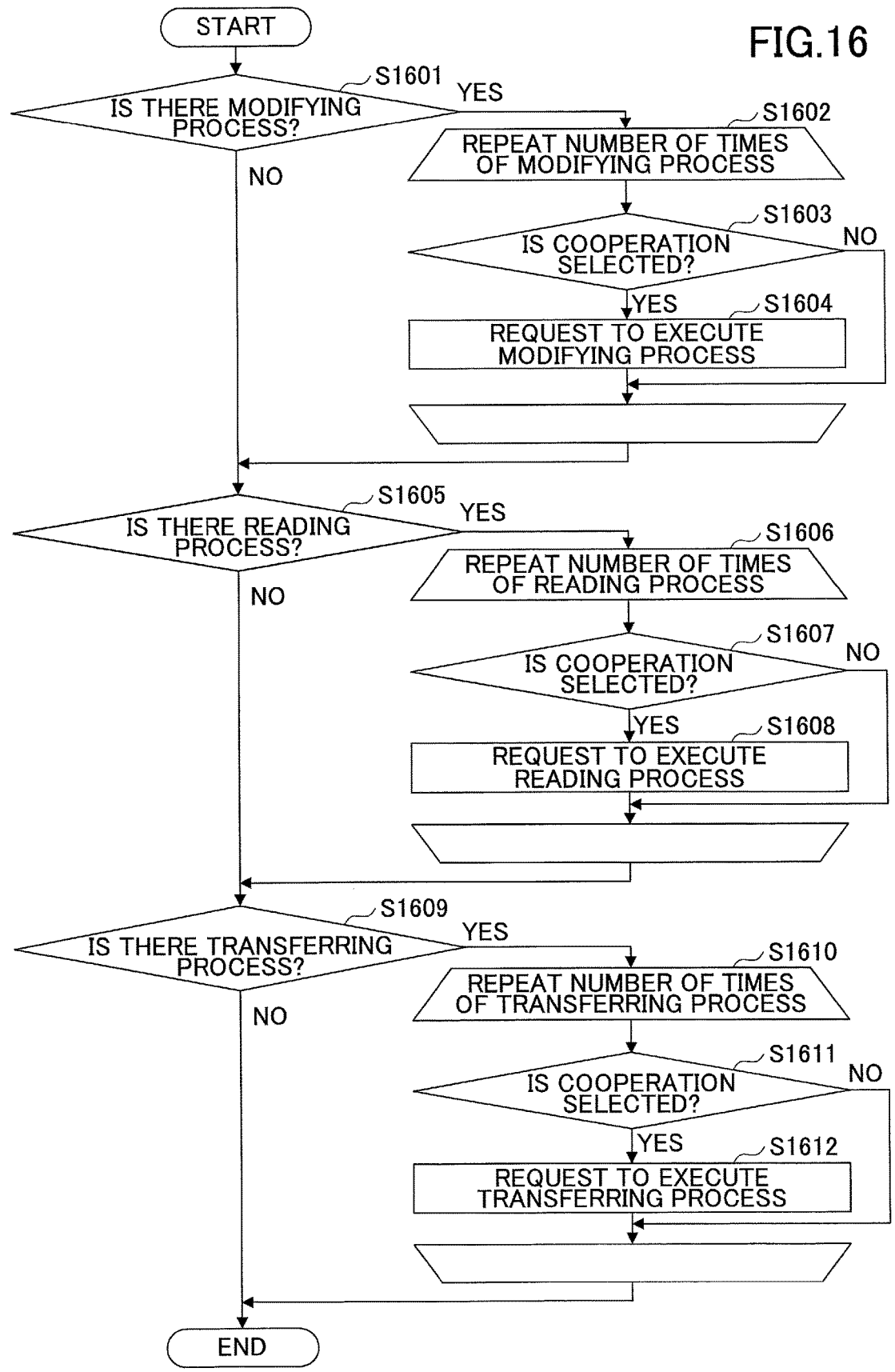
FIG. 16 is a flowchart of an example of a requesting process according to the second embodiment of the present invention.

FIG. 16 is a flowchart of an example of a requesting process according to the second embodiment.

In step S1601, the requesting unit 715 of the renderer 333 determines whether there is a modifying process in the process information for which the determining unit 714 has determined the execution order.

When there is no modifying process, the requesting unit 715 proceeds to the process of step S1605. Conversely, when there is a modifying process, the requesting unit 715 proceeds to the process of step S1602.

Upon proceeding to step S1602, the requesting unit 715 sequentially executes the processes of steps S1603 and S1604 for each of the modifying processes included in the process information for which the determining unit 714 has determined the execution order.

In step S1603, by using the setting information acquired by the setting information acquiring unit 711, the requesting unit 715 determines whether cooperation of a modifying process to be processed, has been selected.

When cooperation of a modifying process has been selected, the requesting unit 715 requests the process executing unit 605 to execute the modifying process in step S1604. Conversely, when cooperation of modifying processes has not been selected, the requesting unit 715 does not request the process executing unit 605 to execute the modifying process. By this process, the requesting unit 715 can execute only the modifying process for which the check box 1422 "to cooperate" has been selected in the extended function selection screen 1420 illustrated in FIG. 14B, among the modifying processes for which the determining unit 714 has determined the execution order.

In step S1605, the requesting unit 715 determines whether there is a reading process in the process information for which the determining unit 714 has determined the execution order.

When there is no reading process, the requesting unit 715 proceeds to the process of step S1609. Conversely, when there is a reading process, the requesting unit 715 proceeds to the process of step S1606.

Upon proceeding to step S1606, the requesting unit 715 executes the processes of steps S1607 and S1608 for each of the reading processes included in the process information for which the determining unit 714 has determined the execution order.

In step S1607, by using the setting information acquired by the setting information acquiring unit 711, the requesting unit 715 determines whether cooperation of a reading process to be processed, has been selected.

When cooperation of a reading process has been selected, the requesting unit 715 requests the process executing unit 605 to execute the reading process in step S1608. Conversely, when cooperation of reading processes has not been selected, the requesting unit 715 does not request the process executing unit 605 to execute the reading process. By this process, the requesting unit 715 can execute only the reading process for which the check box 1422 "to cooperate" has been selected in the extended function selection screen 1420 illustrated in FIG. 14B, among the reading processes for which the determining unit 714 has determined the execution order.

In step S1609, the requesting unit 715 determines whether there is a transferring process in the process information for which the determining unit 714 has determined the execution order.

When there is no transferring process, the requesting unit 715 ends the process. Conversely, when there is a transferring process, the requesting unit 715 proceeds to the process of step S1610.

Upon proceeding to step S1610, the requesting unit 715 executes the processes of steps S1611 and S1612 for each of the transferring processes included in the process information for which the determining unit 714 has determined the execution order.

In step S1611, by using the setting information acquired by the setting information acquiring unit 711, the requesting unit 715 determines whether cooperation of a transferring process to be processed, has been selected.

When cooperation of a transferring process has been selected, the requesting unit 715 requests the process executing unit 605 to execute the transferring process in step S1612. Conversely, when cooperation of transferring processes has not been selected, the requesting unit 715 does not request the process executing unit 605 to execute the transferring process. By this process, the requesting unit 715 can execute only the transferring process for which the check box 1422 "to cooperate" has been selected in the extended function selection screen 1420 illustrated in FIG. 14B, among the transferring processes for which the determining unit 714 has determined the execution order.

Here, referring back to FIG. 15, the description of the sequence of the printing process is continued.

When render data is output from the renderer 333 in step S1517 in the process by the renderer 333, the renderer 333 sends a render instruction instructing printing to the image forming apparatus (step S1518).

In step S1519, the image forming apparatus 20 executes printing of the render data.

In steps S1520 through S1522, a completion report indicating the completion of printing is sent to the renderer 333, the OS 302, and the application 301, etc.

As described above, by the client device 10 according to the present embodiment, the user can selectively execute the functions that the user desires to use, from among the processes executed by the plurality of process executing units 605.

In the V3 printer driver, for example, an extended function of uploading render data to the cloud has been implemented by the port monitor 602, etc. However, since it is not possible to select a plurality of the port monitors 602 at the time of printing, in the related art, it is difficult to execute a plurality of extended functions in combination.

On the other hand, according to the present embodiment, any of the extended functions can be combined and executed, from among a plurality of extended functions.

Third Embodiment

In the first and second embodiments, an example in which the determining unit 714, which determines the execution order of processes executed by the plurality of process executing units 605, is included in the renderer 333 of the printer driver 303, has been described.

In the third embodiment, an example in which the determining unit 714, which determines the execution order of processes executed by the plurality of process executing units 605, is included in the cooperation program 604, will be described.

Functional Configuration—Third Embodiment

FIG. 17 is a functional block diagram of the renderer 333 and the cooperation program 604 according to the third embodiment. The renderer 333 illustrated in FIG. 17 does not include the determining unit 714, among the functional units included in the renderer 333 according to the first embodiment illustrated in FIG. 7. In addition to the functional units of the cooperative program 604 according to the first embodiment illustrated in FIG. 7, the cooperative program 604 illustrated in FIG. 17 includes the determining unit 714.

By the above configuration, the determining unit 714 of the cooperation program 604 determines the execution order of processes to be executed by the plurality of process executing units 605, for example, when installed in the client device 10. Furthermore, the process information saving unit 721 of the cooperation program 604 stores the process information 701, in which the execution order of processes has been determined by the determining unit 714, in the process information storage unit 603.

Process Flow—Third Embodiment

FIG. 18 is a flowchart of an example of an installing process of a cooperation program according to the third embodiment.

In step S1801, when the cooperation program 604 is installed in the client device 10, the cooperation program 604 executes the processes of step S1802 and onward.

In step S1802, the arranging unit 722 of the cooperation program 604 arranges the plurality of process executing units 605 in the program area 606. For example, the arranging unit 722 saves the plurality of process executing units 605 in a predetermined folder (for example, C: ¥ Program Files).

In step S1803, the cooperation program 604 causes the process to branch depending on whether the process information 701 has already been stored in the process information storage unit 603.

When the process information 701 is not stored in the process information storage unit 603, the process information saving unit 721 of the cooperation program 604 saves the process information 701 in the process information storage unit 603 (step S1804). In the process information 701 according to the present embodiment, it is assumed that the execution order of processes executed by the plurality of process executing units 605 is defined in advance.

Conversely, when the process information 701 is stored in the process information storage unit 603, the cooperation program 604 proceeds the process to step S1805.

In step S1805, the determining unit 714 of the cooperation program 604 reads the process information 701 stored in the process information storage unit 603.

In step S1806, the determining unit 714 adds the process information 701, which has been read from the process information storage unit 603, to the process information of the cooperation program 604, and executes, for example, the process of determining the execution order as illustrated in FIG. 10.

In step S1807, the process information saving unit 721 saves the process information 701, in which the execution order is determined in step S1806, in the process information storage unit 603.

By the above process, the cooperation program 604 determines the execution order of the processes executed by the plurality of process executing units 605, for example, when the cooperation program 604 is installed in the client device 10, and saves the process information 701, in which the execution order is determined, in the process information storage unit 603.

Example of Process Information—Third Embodiment

FIG. 19 is a diagram illustrating an example of process information according to the third embodiment. In the example of FIG. 19, in the process information 701, a modifying process 1901, a reading process 1902, and a transferring process 1903 are listed via commas ",", and are described such that the three processes are executed in series (sequentially). As described above, in the process information 701 according to the third embodiment, the execution order of the processes executed by the plurality of process executing units 605 is defined in advance.

Note that the process information 701 illustrated in FIG. 19 is an example; the execution order may be determined such that the processes are executed in parallel, or processes executed in parallel and processes executed in series may be mixed.

As a preferable example, the process information 701 may include information 1904 indicating a condition under which the process is executed. In the example of FIG. 19, the modifying process 1901 includes information 1904 indicating the condition under which the process is executed, and a character string "color==color" is included as a condition under which the process is executed. The character string "color==color" indicates that the process is executed only when the print setting is "color printing".

That is, among the modifying process 1901, the reading process 1902, and the transferring process 1903 included in the process information 701 illustrated in FIG. 19, the modifying process 1901 and the reading process 1902 are executed when the print setting is "color print". This makes it possible to execute the authentication process (an example of the modifying process 1901) and the log acquisition process (an example of the reading process 1902), for example, only when performing color printing.

As described above, according to the present embodiment, since the execution order of processes and execution conditions, etc., are set in advance in the process information 701 stored in the process information storage unit 603, the load on the printer driver 303 can be reduced.

According to one embodiment of the present invention, in a printer driver to which a plurality of extended functions can be added, processes can be performed in the desired order, by the extended functions that have been added to the printer driver.

The information processing apparatus, the information processing system, and the information processing method are not limited to the specific embodiments described in the detailed description, and variations and modifications may be made without departing from the spirit and scope of the present invention.

What is claimed is:

1. An information processing apparatus for executing a printer driver that requests an image processing apparatus to perform image processing on data, the information processing apparatus comprising a processor, in communication with a memory, executing a process including:
   executing, by a plurality of process executors, a predetermined process of a first type and a predetermined process of a second type, according to a request from the printer driver; wherein the predetermined process of the first type and the predetermined process of the second type are extended functions added to the printer driver; and wherein the predetermined process of the first type is a modifying process and the predetermined process of the second type is a reading process;
   saving, in a storage, process information that includes information indicating where each process executor is stored and information indicating whether each process executor is a modifying type process executor or a reading type process executor;
   determining an execution order of the predetermined processes that are respectively executed by the plurality of process executors in the printer driver, based on the saved process information and execution order information including first information indicating that processes of the first type are to be executed sequentially, second information indicating that processes of the second type are to be executed in parallel, third information indicating the first type, and fourth information indicating the second type; and
   requesting the plurality of process executors to execute, on the data, the predetermined processes in the determined execution order, according to an instruction from the printer driver.

2. The information processing apparatus according to claim 1, wherein the process further includes converting the data, which is a target of the image processing, into render data that is processable by the image processing apparatus, according to an instruction from the printer driver.

3. The information processing apparatus according to claim 2, wherein the process includes executing a third process of transferring the render data to a transfer destination.

4. The information processing apparatus according to claim 3, wherein the determining includes determining the execution order such that the first process is executed before the second process, upon detecting that the predetermined processes executed by the plurality of process executors include the first process and the second process.

5. The information processing apparatus according to claim 3, wherein the determining includes determining the execution order such that the second process is executed before the third process, upon detecting that the predetermined processes executed by the plurality of process executors include the second process and the third process.

6. The information processing apparatus according to claim 3, wherein the determining includes determining the execution order such that the first process is executed before the third process, upon detecting that the predetermined processes executed by the plurality of process executors include the first process and the third process.

7. The information processing apparatus according to claim 3, wherein the determining includes determining the execution order such that a plurality of the first processes are sequentially executed, upon detecting that the predetermined processes executed by the plurality of process executors include the plurality of the first processes.

8. The information processing apparatus according to claim 3, wherein the determining includes determining the execution order such that a plurality of the second processes are executed in parallel or sequentially executed, upon detecting that the predetermined processes executed by the plurality of process executors include the plurality of the second processes.

9. The information processing apparatus according to claim 3, wherein the determining includes determining the execution order such that a plurality of the third processes are executed in parallel or sequentially executed, upon detecting that the predetermined processes executed by the plurality of process executors include the plurality of the third processes.

10. The information processing apparatus according to claim 3, wherein the process further includes displaying, on a user interface, a setting screen used for selecting at least one of the predetermined processes to be executed on the render data, from among the predetermined processes executed by the plurality of process executors, according to an instruction from the printer driver.

11. The information processing apparatus according to claim 10, wherein the requesting includes requesting the plurality of process executors to execute the at least one of the predetermined processes selected in the setting screen, among the predetermined processes executed by the plurality of process executors.

12. The information processing apparatus according to claim 1, wherein the determining includes determining the execution order according to an instruction from the printer driver.

13. The information processing apparatus according to claim 1, wherein the process further includes:
 executing a cooperation program configured to cooperate with the printer driver;
 arranging the plurality of process executors in a storage area that is accessible from the printer driver, according to an instruction from the cooperation program;
 wherein the process information is used by the printer driver for causing the plurality of process executors to execute the predetermined processes, according to an instruction from the cooperation program.

14. The information processing apparatus according to claim 13, wherein the process further includes determining the execution order according to an instruction from the cooperation program.

15. An information processing system comprising:
 an image processing apparatus; and
 a processor in communication with a memory, the processor executing a process including:
 executing a printer driver that requests the image processing apparatus to perform image processing on data,
 executing, by a plurality of process executors, a predetermined process of a first type and a predetermined process of a second type, according to a request from the printer driver; wherein the predetermined process of the first type and the predetermined process of the second type are extended functions added to the printer driver; and wherein the predetermined process of the first type is a modifying process and the predetermined process of the second type is a reading process;
 saving, in a storage, process information that includes information indicating where each process executor is stored and information indicating whether each process executor is a modifying type process executor or a reading type process executor;
 determining an execution order of the predetermined processes that are respectively executed by the plurality of process executors in the printer driver, based on the saved process information and execution order information including first information indicating that processes of the first type are to be executed sequentially, second information indicating that processes of the second type are to be executed in parallel, third information indicating the first type, and fourth information indicating the second type; and
 requesting the plurality of process executors to execute, on the data, the predetermined processes in the determined execution order, according to an instruction from the printer driver.

16. An information processing method, executed by a computer, in an information processing apparatus for executing a printer driver that requests an image processing apparatus to perform image processing on data, the information processing method comprising:
 executing, by a plurality of process executors, a predetermined process of a first type and a predetermined process of a second type, according to a request from the printer driver; wherein the predetermined process of the first type and the predetermined process of the second type are extended functions added to the printer driver; and wherein the predetermined process of the first type is a modifying process and the predetermined process of the second type is a reading process;
 saving, in a storage, process information that includes information indicating where each process executor is stored and information indicating whether each process executor is a modifying type process executor or a reading type process executor;
 determining an execution order of the predetermined processes that are respectively executed by the plurality of process executors in the printer driver, based on the saved process information and execution order information including first information indicating that processes of the first type are to be executed sequentially, second information indicating that processes of the second type are to be executed in parallel, third information indicating the first type, and fourth information indicating the second type; and
 requesting the plurality of process executors to execute, on the data, the predetermined processes in the determined execution order, according to an instruction from the printer driver.

* * * * *